United States Patent [19]

Welander

[11] Patent Number: 5,743,801
[45] Date of Patent: Apr. 28, 1998

[54] COLLECTABLE VIDEO SPORTS CARD

[76] Inventor: Paul M. Welander, 1500 Tamarack Ave., Boulder, Colo. 80304

[21] Appl. No.: 697,023

[22] Filed: Aug. 19, 1996

Related U.S. Application Data

[60] Provisional application No. 60/002,526, Aug. 18, 1995.

[51] Int. Cl.[6] ........................................... A63F 9/24
[52] U.S. Cl. ............................................. 463/44
[58] Field of Search .................... 463/43, 44, 45, 463/46, 47; 273/236, 237, 238; 380/4, 23, 25; 40/427, 442, 445

[56] References Cited

U.S. PATENT DOCUMENTS 5,533,124  7/1996  Smith et al. .............................. 380/4
5,641,164  6/1997  Doederlein et al. ...................... 273/273

*Primary Examiner*—George Manuel

[57] ABSTRACT

A sports commemorative having an exterior which resembles a sportscard and also having the capacity to store a video highlight sequence. The video highlight sequence features an entity, most commonly an athlete, and is stored as data in a video storage means 12. A decorated housing means 10 surrounds and houses the video storage means 12. The decorated housing means 10 also has, as a part of its structure, an interface means 14. When the interface means 14 is removably connected with a display means, the video highlight sequence may be displayed by the display means. The decorated housing means 10 also supports an identification means 20. The identification means 20 resembles the front of a sportscard and serves to commemorate the featured entity in that fashion.

21 Claims, 20 Drawing Sheets

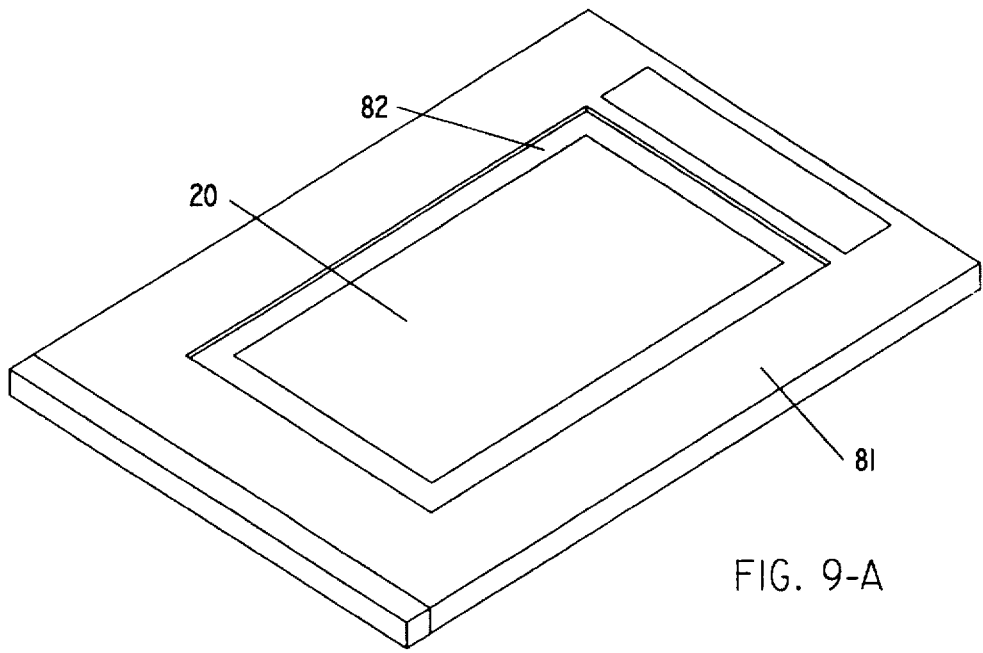
FIG. 9-A
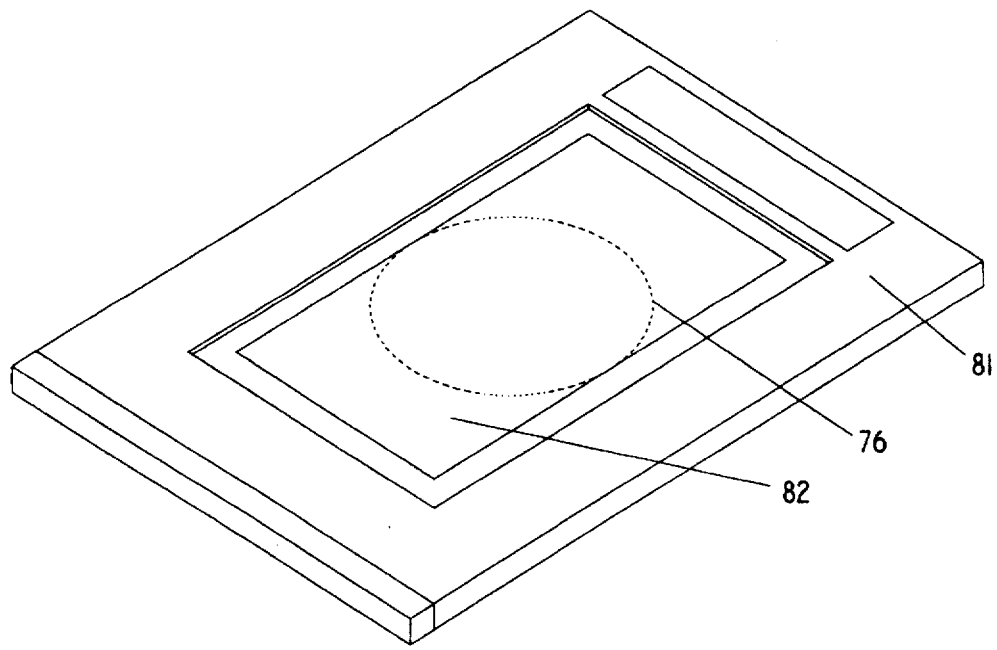
FIG. 9-B

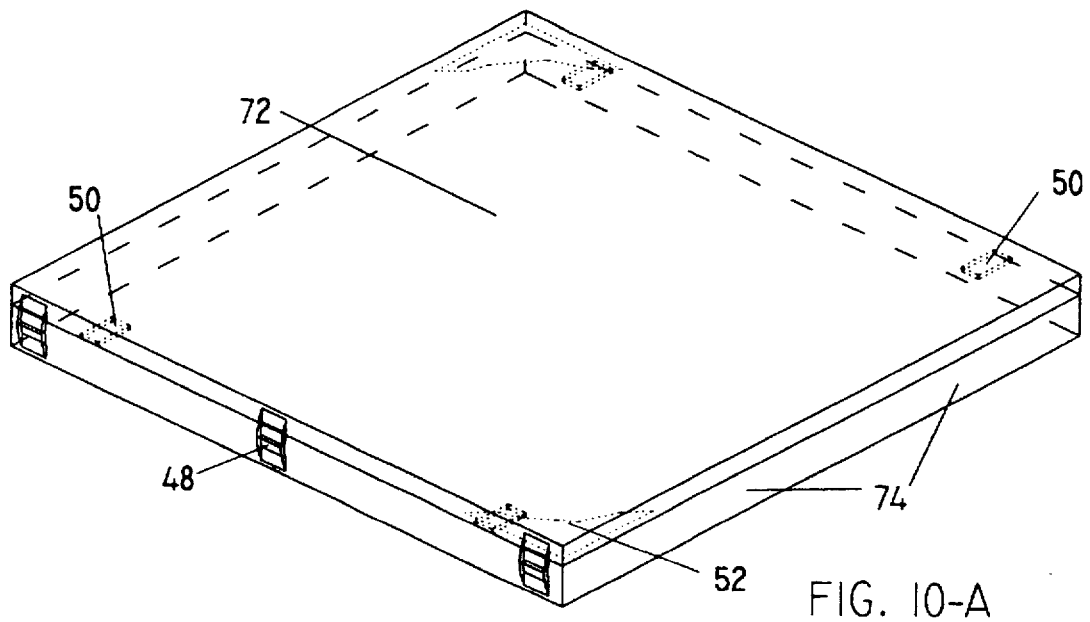
FIG. 10-A
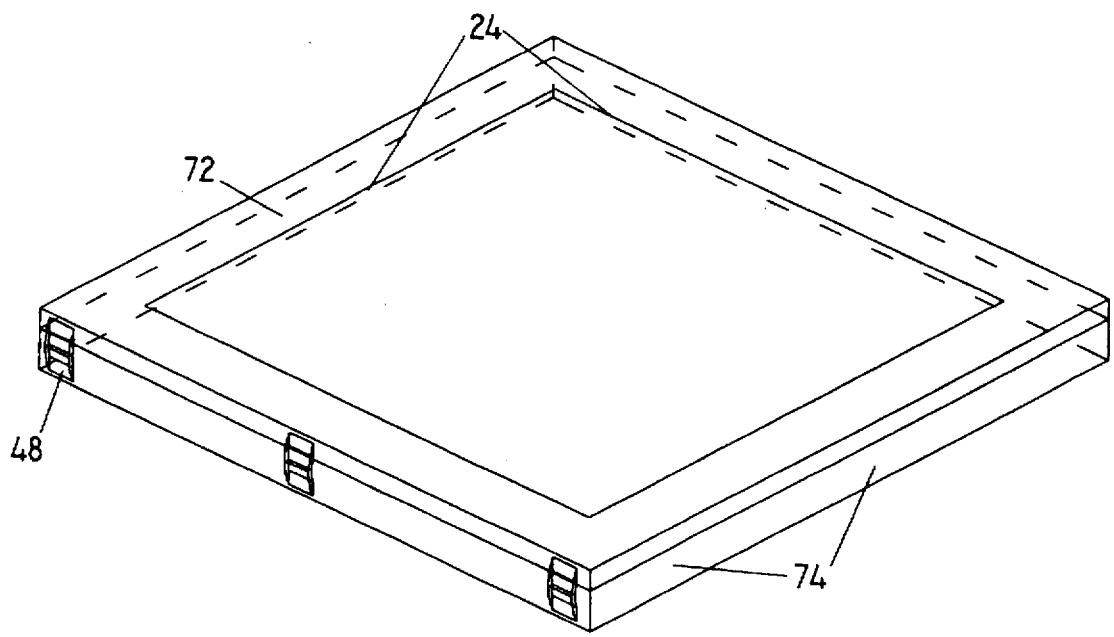
FIG. 10-B

5,743,801

1

COLLECTABLE VIDEO SPORTS CARD

This application claims the benefit of U.S. Provisional Patent No. 60/002526 filed on 18 Aug., 1995.

BACKGROUND—FIELD OF THE INVENTION

This invention relates to a combination of the field of cardboard sportscards with the field of video storage and display systems.

BACKGROUND—DESCRIPTION OF PRIOR ART

Because the invention is a combination relating to two very different fields, a brief description of the nature of the invention would help to give a framework in which to examine the prior art. The invention relates to producing a sportcard which also has the capability to store video highlights. Thus, the discussion of the prior art will focus on sportscards, video storage devices, and the potential of different storage devices to embody a sportscard collectable. Prior art follows:

Sportscards, such as baseball cards, have existed in essentially the same form since the early 1900's. They are, generally a piece of cardboard decorated with pictorial images, statistical information and graphic embellishment and feature an individual athlete. The vast majority of all sportscards are approximately six and one-quarter centimeters by eight and three-fourths by the thickness of the cardboard although a few have been produced in a bigger or smaller format. Although, they can be thought of as merely printed matter on a backing material, a sportscard has come to represent more than the sum of its parts. It has a long tradition of being a collectable. The subject matter of sports stars is one factor in the popularity of sportscards. Its small size and decorative pictorial embellishment are also suited for the realm of collectable commemoratives. Sportscards have become a recognizable form in and of themselves. The form is differentiated from a mere piece of paper with a photograph on it because of its traditional size, its almost exclusive feature of athletes, pictures, its content of depicting and informing about an actual person, its semi-rigid backing material, and the fact that they are issued annually in large sets of as many as 500 cards in a set. They perform the function of being collectables.

Sportscards have been produced which offer a short action sequence through the use of holograms. However, these action sequences last for only a few seconds and are somewhat dependent on lighting conditions to be effective.

Video cassette tapes for use with a video recording machine could store video highlights, however they are much larger than sportscards. To collect a set of 500 cassette-tape-sized comemoratives would take a vast amount of space for storage. It would also be difficult to mistake a cassette tape for a sportscard even if it had pictures and related information on its surface. Video tapes are much more suited to storing features lasting an hour or two. In this regard they are more encyclopedic than commemorative.

A miniature cassette tape would be much more conducive to being used in a sportscard format. However, mini-video cassettes are used almost exclusively in hand-held video camera applications.

Compact disks for use with a personal computer have been produced which feature encyclopedias of sports. None have been used to feature individuals with commemorative embellishments on the exterior.

2

Calculators have been produced which store a database of sports statistics. These, however, offer no pictorial or commemorative features.

Video game cartridges are used to store video information for use with video games. The software programs are interactive in nature, providing a game matrix which the player manipulates. The small size of such a cartridge is much more conducive to a commemorative application. Furthermore, cartridges have never been decorated with photographs of actual people in a commemorative fashion. Video game cartridges do have the capacity to store very recognisable video images. If highlight footage were played on hand-held video game unit with a high-resolution screen, the characters involved could be made to be very recognisable. The Game Gear™ video game unit by Sega™ ® has such capabilities. In the NBA Jam Session game by Sega™ actual basketball players are realistically represented. However, the images are used for game applications and the cartridges have no commemorative value.

Hand-held video game units would be very compatible for use with a collectable. The portable size and ability to run on batteries would make it flexible for trading activities.

A liquid crystal video display with sportscard-sized video storage attachments would be ideal for a commemorative application. A small display screen of the same size would be very well-suited for closely resembling the characteristics of a sportscard. However, they have not been used toward this end.

OBJECTS AND ADVANTAGES

A sportscard with video storage capabilities would greatly expand the ability of a sportscard to commemorate an athlete. Video highlight segments are much more evocative of the skills of athletes than are photographs. The video sportscard offers a synthesis of the traditional sportscard but with this greatly expanded ability to inform and commemorate.

A video sportscard in the format of a liquid crystal photograph or similar system offers extreme portability, to the point where a combination video sportscard/LCD screen display device takes up no more room than a sportscard.

The video sportscard offers much more "room" in which to provide images and information concerning the athlete. The video highlight sequence stored in the sportscard offers several minutes of video and audio in which to provide such information. The traditional sportscard offers only two small surfaces without a sequence of video highlights and without sound.

Still further objects and advantages will become apparent from a consideration of the ensuing description and drawings.

BRIEF DESCRIPTION OF THE DRAWING FIGURES

FIG. 1 describes the general structure of the video commemorative

FIG. 2 describes the video sportscard in its preferred embodiment of a video game cartridge used with a hand-held video game unit FIG. 3 describes the decorated housing means and video storage means in the form of a modified video game cartridge FIGS. 4a and 4b describe the front and rear identification means FIG. 5 is a flowchart which describes the preferred embodiment of the content of the video highlight sequence FIGS. 6a and 6b describe the preferred embodiment of a cartridge display box and an alternative embodiment of a cartridge display box FIG. 7 describes a two-piece cartridge for use with the video sportscard FIG. 8 describes the decoration of a compact or video disk for its use with the video sportscard FIGS. 9a and 9b describe two embodiments of a compact disk cassette as the decorated housing means and video storage means of the video sportscard FIGS 10a and 10b describe two embodiments of a compact disk display box and their use with the video sportscard FIG. 11 describes the video sportscard realized in conjunction with a home video game system FIG. 12 describes the video sportscard realized in conjunction with a video recording and playing system FIG. 13 describes a magnetic tape cartridge and its use as a video storage means and decorated housing means for a video tape and its use with the video sportscard FIG. 14 describes an adaptor for adapting a magnetic tape cartridge or mini-video cassette tape for use as a decorated housing means for a video tape used in conjunction with a video playing or recording machine applied to the video sportscard FIG. 15 describes a custom video cassette playing machine and its use with the video sportscard FIGS. 16a and 16b describe a liquid crystal photograph and its use with the video sportscard FIG. 17 describes the video sportscard realized in the format of a personal computing system FIG. 18 is a diagram which illustrates a preferred embodiment of the arrangement of devices used to transfer the video highlight sequence from video tape to data stored in a read-only memory FIG. 19 describes, in a diagram, a preferred embodiment of the electronic circuitry of the processing means, the electronic circuitry of the retrieval means, the electronic circuitry of the video storage means and the interconnection of all three FIG. 20 is a flowchart which describes a preferred embodiment, of the programmatic operation of the video highlight sequence and the electronic circuitry elements involved in carrying out that program

LIST OF DRAWING FIGURE REFERENCE NUMERALS 10 decorated housing means
12 video storage means
14 interface means
15 display means
16 hand-held video game unit
18 means to support decoration
20 identification means
22 identifying elements
24 front identification means
26 rear identification means
28 front photograph
30 rear photograph
31 reference number
32 main body
34 interface slot
36 display screen
38 control buttons
40 speaker
42 headphone jack
46 front cover
48 hinges
49 supplemental identification means
50 tabs
52 front insert booklet
54 box body
56 moulded surround
58 display slot
64 written information
66 pictorial image
72 disk box front cover
74 disk box body
76 compact disk
81 disk cassette housing
82 disk cassette front panel
88 video cassette
92 decorated housing means for a video tape
93 video cassette tape
94 top surface of housing
96 adaptor
98 video recording or playing machine (VCR)
100 tape port
102 control means
106 custom video cassette playing machine
112 interface core
114 highlight-specific cartridge attachment
130 video display monitor
132 home video game unit
134 connecting means
136 cartridge
138 retrieval means
140 processing means
152 mode control means
154 first section of two-piece interconnecting casing
155 power switch
156 second section of two-piece interconnecting casing
158 liquid crystal display screen
160 connection means
166 lower portion of second section
170 personal computer
172 diskette
174 disk drive
178 decorated diskette label
180 keyboard
200 cartridge read-only memory (ROM)
202 circuitboard
204 circuit leads
206 connector
210 system read-only memory (ROM)
212 system random-access memory (RAM)
214 central processing unit (CPU)
216 address bus
218 data bus
220 sound generator
222 video display processor
224 video RAM
226 modulator
250 read-write buffer
252 read-only memory programming system

DETAILED DESCRIPTION OF THE DRAWING FIGURES

GENERAL STRUCTURE OF THE VIDEO SPORTSCARD

The video sportscard, is a collectable commemorative in the form of a sportscard which also has a video component.

The video sportscard commemorates a variety of subjects, but most commonly it features an individual athlete on its exterior and in its video component. Although the video sportscard may feature a variety of subjects, in this description the subject will most often be referred to as an athlete.

Figure 1:
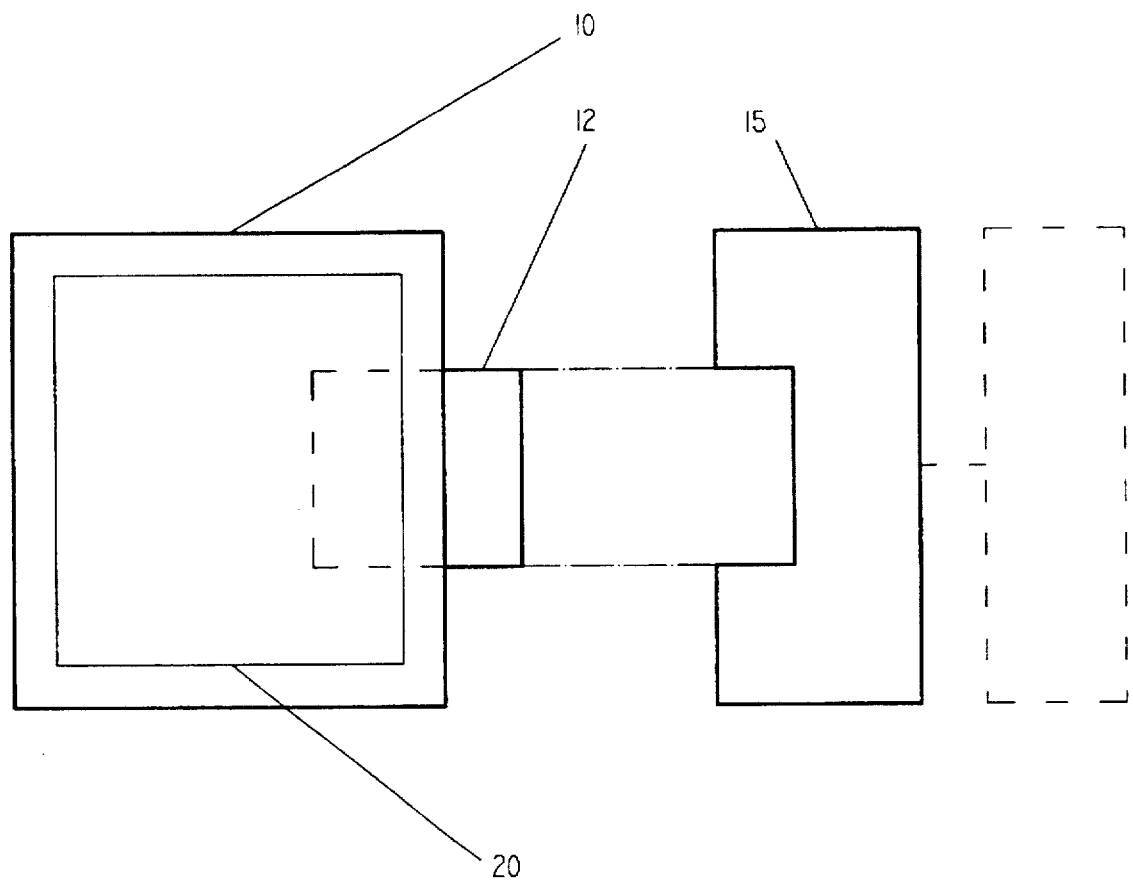

FIG. 1 describes the general structure of the video sportscard. In general, the video sportscard consists of a decorated housing means 10, which contains, within its structure, a video storage means 12. The decorated housing means 10 also supports an identification means 20 on its exterior surface. This identification means 20 consists of pictures, statistical information and other elements featuring the athlete, or other subject. The video storage means 12 contains a video highlight sequence which has moving video images of the same featured athlete.

This video highlight sequence is displayed on a display means 15. This display means 15 is outside the scope of the video sportscard, but because the video sportscard relies on it to display its video highlight sequence, its interaction with the video sportscard and pertinent elements are described. The display means 15 does not need to be embodied in only one machine. It can consist of two or more devices linked together. For instance, one device may access and process the video highlight sequence and send a video signal to a video screen on which the video highlight sequence is then displayed.

THE PREFERRED EMBODIMENT OF THE VIDEO SPORTSCARD

Figure 2:
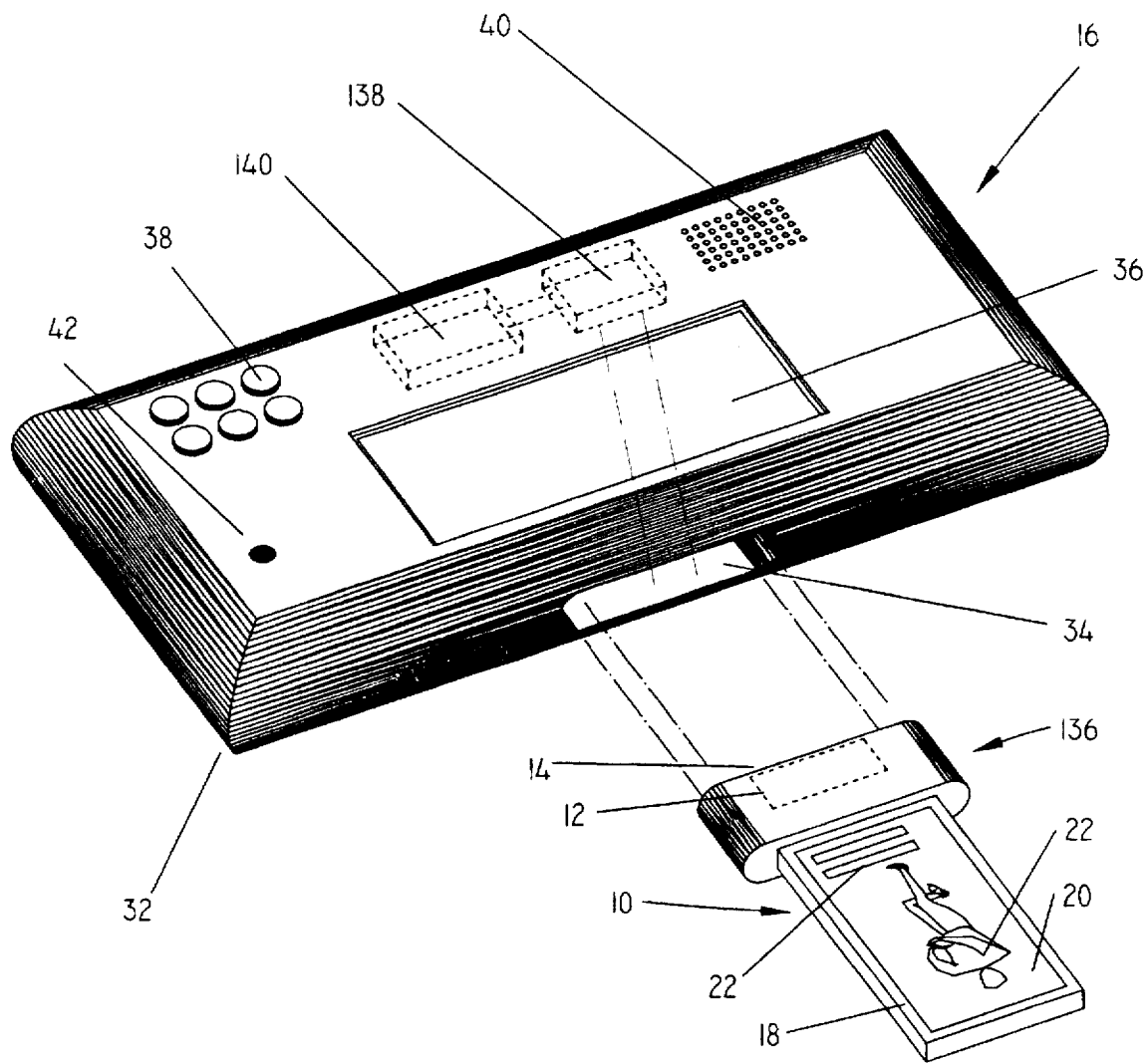

FIG. 2 refers to the preferred embodiment of the particular video diplay system in which the video sportscard can be realized. In the preferred embodiment, the video sportscard is a video game cartridge 136 modified to have the exterior appearance and content of a sportscard and containing a video highlight sequence. Both the exterior and the video highlight sequence feature the same individual athlete. The video game cartridge 136 is inserted into a hand-held video game unit 16 to allow the video highlight sequence to be displayed on the display screen 36 of the unit 16. The cartridge 136 embodies both the decorated housing means 10 and the video storage means 12.

The decorated housing means 10 supports, on its exterior, an identification means 20 composed of identifying elements 22 which include a photograph of the athlete, the athlete's name, the athlete's position on a team and the name of the team the athlete plays on. Mounted inside the outer, protective shell of the decorated housing means 10 is the video storage means 12 in the form of a computer memory chip which includes a read-only memory (ROM) 200. ROM 200 is not shown in FIG. 2. This computer memory chip stores the video highlight sequence.

The hand-held video game unit 16 is used to display this video highlight sequence. The hand-held video game unit 16 and the display means in general, are outside the scope of the video sportscard, but certain relevant elements will be described generally and diagrammatically. In the preferred embodiment, the main body 32 of the hand-held video game unit 16 is approximately fifteen to twenty centimeters in length, seven and one-half to ten centimeters in width and four to seven centimeters in thickness. The unit 16 may be operated using batteries (not shown) or standard A.C. The hand-held video game unit 16 is similar to the Game Gear™ hand-held video game unit by Sega™ of Redwood City, Calif. The system of the hand-held video game unit is similar to the systems described in U.S. Pat. Nos. 3,658,284 and 3,659,285, (both Baer et al; 1972-04-25) the descriptions of which are incorporated herein by reference. The game unit 16 contains a microprocessor which is part of a processing means 140 (symbolically shown), and other electronic circuitry including video processing and driver circuitry (also a part of the processing means 140 which transmits signals to the display screen 36 of the game unit 16.

For the display of the highlight sequence, the video sportscard in the form of a cartridge 136 is inserted into the hand-held video game unit 16. An interface means 14, formed into the structure of the cartridge 136 removably connects to an interface slot 34 of the game unit 16. This interfacing condition is well known in the art of video game systems. In this condition, circuit leads 204 (not shown in FIG. 2) from the microcircuitry of the video storage means 12, including a read-only memory 200 (not shown in FIG. 2), are connected to the circuitry of video game unit 16 through connectors 206 (not shown in FIG. 2) of the retrieval means 138 (symbolically shown). The interfacing condition allows data representing the video highlight sequence to be accessed and read by the game unit 16 through its retrieval means 138. The video highlight sequence is in the form of a video graphics software program stored in ROM 200. The highlight sequence is then processed for display by the microprocessor and driver circuitry included in the processing means 140 (symbolically shown) and located within the game unit 16. The highlight sequence is then in the form of video signals which are displayed on the display screen 36 of the game unit 16.

In the preferred embodiment of the video sportscard, the display screen 36 is an electro-optical display approximately eight centimeters long and eight centimeters wide. It is, ideally, a high-resolution liquid crystal display screen with the capacity to display several thousand different colors. It allows the display of figures with a great deal of clarity. The hand-held video game unit 16 also has a control means embodied in control buttons 138 (symbolically shown) which protrude from the surface of the main body 32. In their application to the video sportscard, the control buttons 38 allow the viewer to fast-forward, rewind, pause, and stop the action of the highlight sequence as well as to view the highlight sequence in slow-motion. The control buttons 38 also allow the user to choose the point at which to begin viewing the video highlight sequence.

In the preferred embodiment of the unit 16 with regard to the video sportscard, the unit 16 allows sound to be heard in stereo through a speaker 40 located in the main body 32. This allows an audio portion of the highlight sequence to be heard. Headphones may also be inserted into a headphone jack 42 in the main body 32. There is also, ideally, a volume control (not shown).

The above description is a preferred embodiment of the video sportscard in which it is used in conjunction with a hand-held video game unit 16. It should not be interpreted as limiting the specific characteristics of the game unit 165 to those described above for its use with the video sportscard. It should also not be interpreted to limit the video sportscard to be realized solely within the system of a hand-held video game unit 16. Additionally, the description should not be interpreted to limit the video sportscard to the form of a cartridge or the use of a video sportscard in the form of a cartridge to a hand-held video game unit 16. The cartridge 136 should not be interpreted to be limited by the particular description of its video storage means 12 nor the particular description of its identification means 20. Finally, the featured entity of the sportscard should not be considered to be limited to an athlete.

Figure 3:
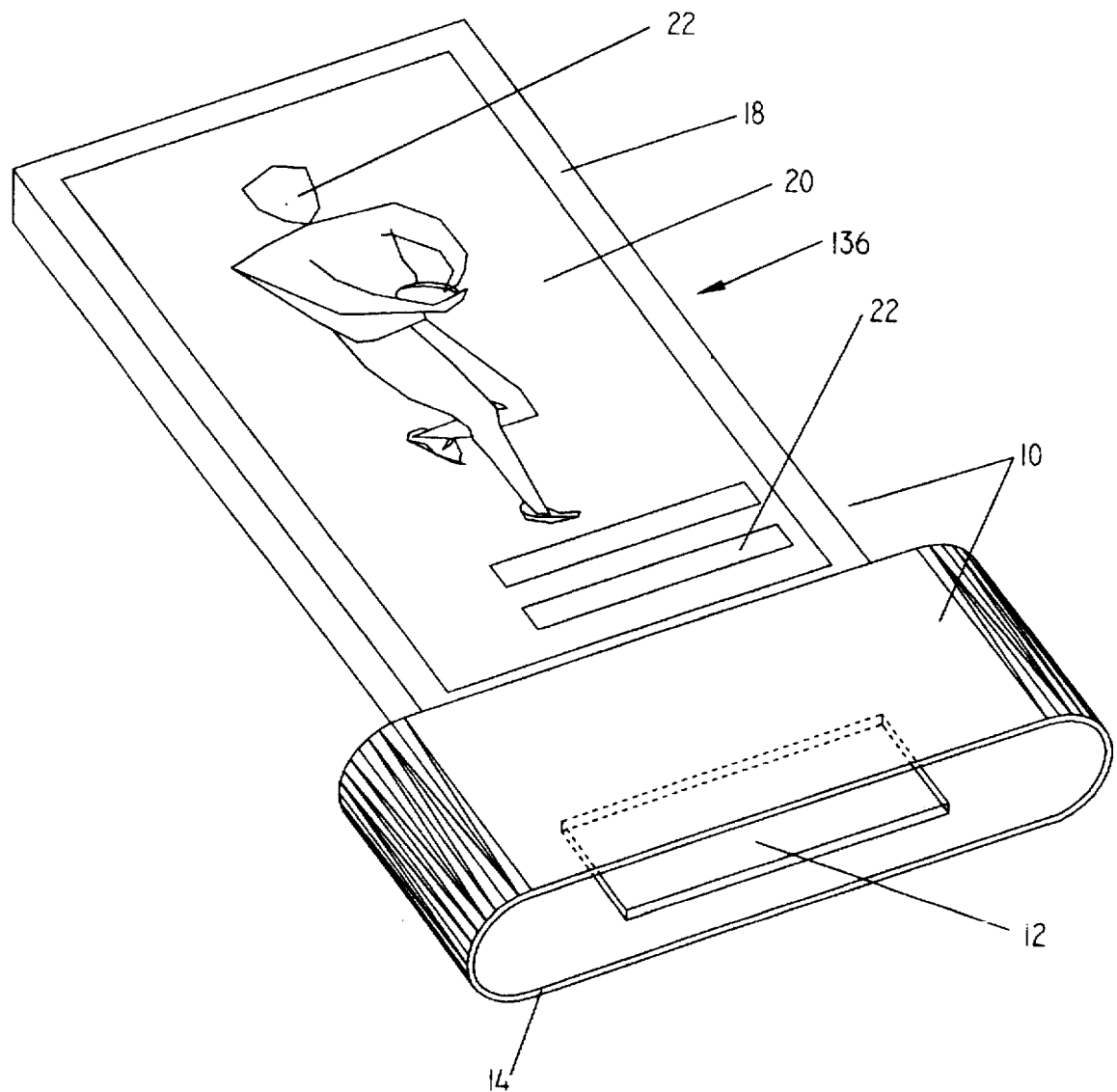

FIG. 3 describes the video game cartridge 136 in more detail. Again, a modified video game cartridge 136 is the preferred embodiment of the decorated housing means 10 and the video storage means 12. This prototype cartridge 136 has a version which has been produced commercially by Sega of America Inc.™ ® of Redwood City, Calif. for use with its Game Gear™ ® hand-held video game system. Other video game companies have also produced similar cartridges. This type of cartridge 136 is well-known in the field of video games. Some of the basic components of the cartridge 136 are described in U.S. Pat. Nos. 5,395,112 (Codemasters Limited; 1995-03-07), No. 4,672,541 (Bromley et al.; 1987-06-09), U.S. Pat. No. 4,359,222 (Smith et al.; 1982-11-16), and U.S. Pat. No. 4,799,635 (Nakagawa; 1989-01- 24) and in U.S. Design Pat. Nos. 252,752 (Thompson et al.; 1978-08-28), No. 272,342 (Cheng; 1984-01-24) and No. 248,470 (Talestore; 1978-07-11) the descriptions of which are incorporated herein by reference. The video storage means 12 is a computer chip having a machine-readable ROM 200 (not shown in FIG. 3) and associated circuitry. This circuitry will be further described in FIGS. 19 and 20. The video storage means 12 stores the video highlight sequence in the form of a video graphics program.

Surrounding the computer chip is a decorated housing means 10. It is made of plastic and is formed to include an interface means 14 to allow the cartridge to be removably connected to the hand-held video game unit 16 so that the video highlight sequence can be shown.

The cartridge 136 should be modified so that the decorated housing means 10 is very close in size to the size of a traditional sportscard. The vast majority of sportscards are six and one-quarter centimeters in width by eight and three-quarters centimeters in length by the thickness of the cardboard (approximately 1 millimeter). In the video sportscard, the decorated housing means 10 will be required to be thicker, in some instances, to allow the video storage means 12 to be housed within. In general, though, the cartridge 136 should be as thin as possible and have the approximate length and width of a sportscard. In other embodiments, the video sportscard may be smaller or larger, but the size should always be small enough that video sportscards may be issued in large sets. Ideally, video sportscards will be produced annually in sets of approximately 250 different video sportscards each featuring an individual athlete. If the size is too big, a person wouldn't be able to collect 250 video sportscards each year and be able to store them without taking up a vast amount of space. Ideally, an entire set of 250 video sportscards may be stored in a shoebox (approx. nineteen centimeters wide by thirty-four centimeters long by twelve centimeters deep).

The decorated housing means 10 also supports an identification means 20. Ideally, there is an identification means 20 on both larger sides of the decorated housing means 10. The identification means 20 is composed of individual identification elements 22 which, ideally, are a picture of the featured athlete, statistical information, the athlete's name, information about the athlete and graphic embellishment all attached to the decorated housing means 10. The identification means 20 resembles a sportscard in its depiction of an athlete and its commemorative arrangement.

The general premise of modifying the cartridge 136 by changing the proportions to those of a sportscard, by adding decorative embellishment typical of a sportscard and by changing the subject matter of any cartridge 136 decals to a depiction of an actual athlete in the fashion of a sportscard is to create a cartridge 136 that could function as a sportscard by its exterior appearance alone, regardless of its video content. Thus, when the video sportscard has the added element of a video highlight sequence, these elements combine to form a sportscard with greatly expanded commemorative capabilities and enhanced ability to depict the athlete by presenting him or her in action.

The above description of the modified cartridge 136 is merely the preferred embodiment of the video sportscard. It is anticipated that other similar embodiments may be used without departing from the spirit of the video sportscard.

For instance, the decorative housing means 10 does not have to be made of plastic. Instead of an integral interface means 14, the housing means 10 could have a detachable interface means or adaptor. This would allow the housing means 10 to be thinner. Such a system is described, in part, in FIG. 7.

Figure 4:
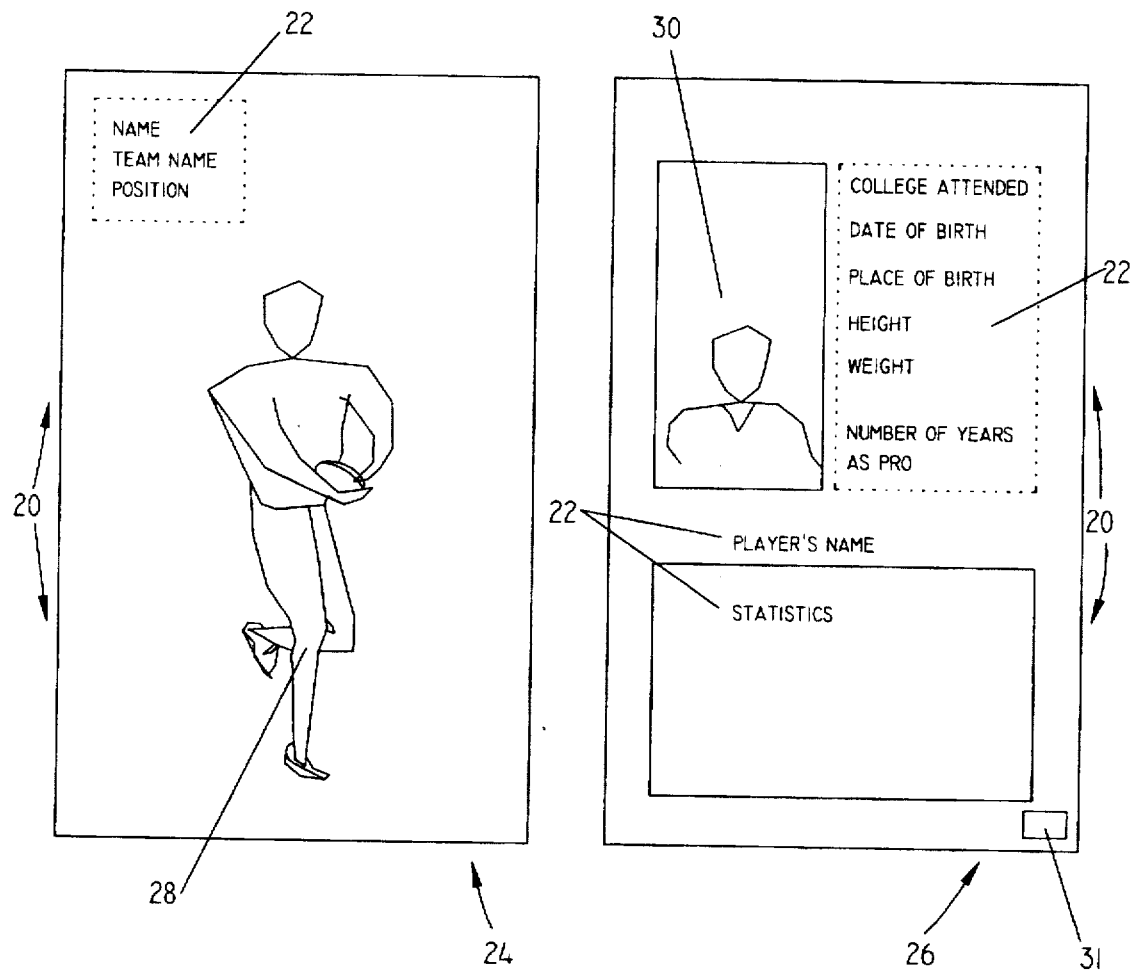

With reference now to FIGS. 4a and 4b, we examine the identification means 20 in more detail. In particular, the front identification means 24 and the rear identification means 26 are described.

Although the identification means 20 has been described as having a photograph, statistical information, and graphic embellishment, in general, an identification means 20 can be composed of any number of identifying elements 22 including pictures of the athlete, holographic images of the athlete, artists' renditions of the athlete, the athlete's name, the athlete's uniform number, the athlete's autograph, the athlete's position on a team, the name of the team on which the athlete plays, the logo of the team on which the athlete plays, relevant statistics, a reference number of the collectable video sportscard in relation to a larger set of video sportscards of which it is a part, personal information about the athlete, information about the athlete's career, graphic elements which enhance the identification means 20 and other elements which help to identify and describe the athlete in a commemorative manner. The identifying elements 22 are preferably in color. Any element which will enhance the commemoration of the athlete can be used as an identifying element 22. The identifying elements 22 may be imprinted, etched, printed, painted or otherwise attached to the decorated housing means 10. They may also be attached to another piece of material which is then attached to the decorated housing means 10. Any material suitable for attachment to the decorated housing means 10 may be used to support the identifying elements 22. The thin material can be paper, plastic, metal or any other material which can be attached to the decorated housing means 10.

In the preferred embodiment, the front identification means 24 contains a front photograph 28, in color, of the featured athlete along with other identifying elements 22 including the player's name, team position and team name. In the preferred embodiment, the rear identification means 26 contains a smaller rear photograph 30 of the featured athlete along with personal information and statistics. Personal information about the athlete includes the athlete's date of birth, the athlete's place of birth, college attended, the number of years of professional experience, height and weight. Statistical information includes a year-by-year list of the athlete's statistics in categories relevant to the team position of the athlete as well as a cumulative career total of the athlete's statistics and career statistical milestones and accomplishments. In addition, there is a reference number 31 which indicates the place of that particular video sportscard in a greater series of video sportscards. This reference number 31 allows collectors to keep track of which video sportscards they have and the numbers of video sportscards they need to attain a complete set. In the preferred embodiment, the identifying elements 22 are printed clearly and in color on a thin piece of durable plastic which is affixed by adhesive to both larger sides of the decorated housing means 10.

FIGS. 4a and 4b describe the preferred embodiments of the front identification means 24 and the rear identification means 26 and are not the only possible formats. The spirit of the identification means 20 is the intention to depict the featured athlete so that the decorated housing means 10 resembles a sportscard.

Figure 5:
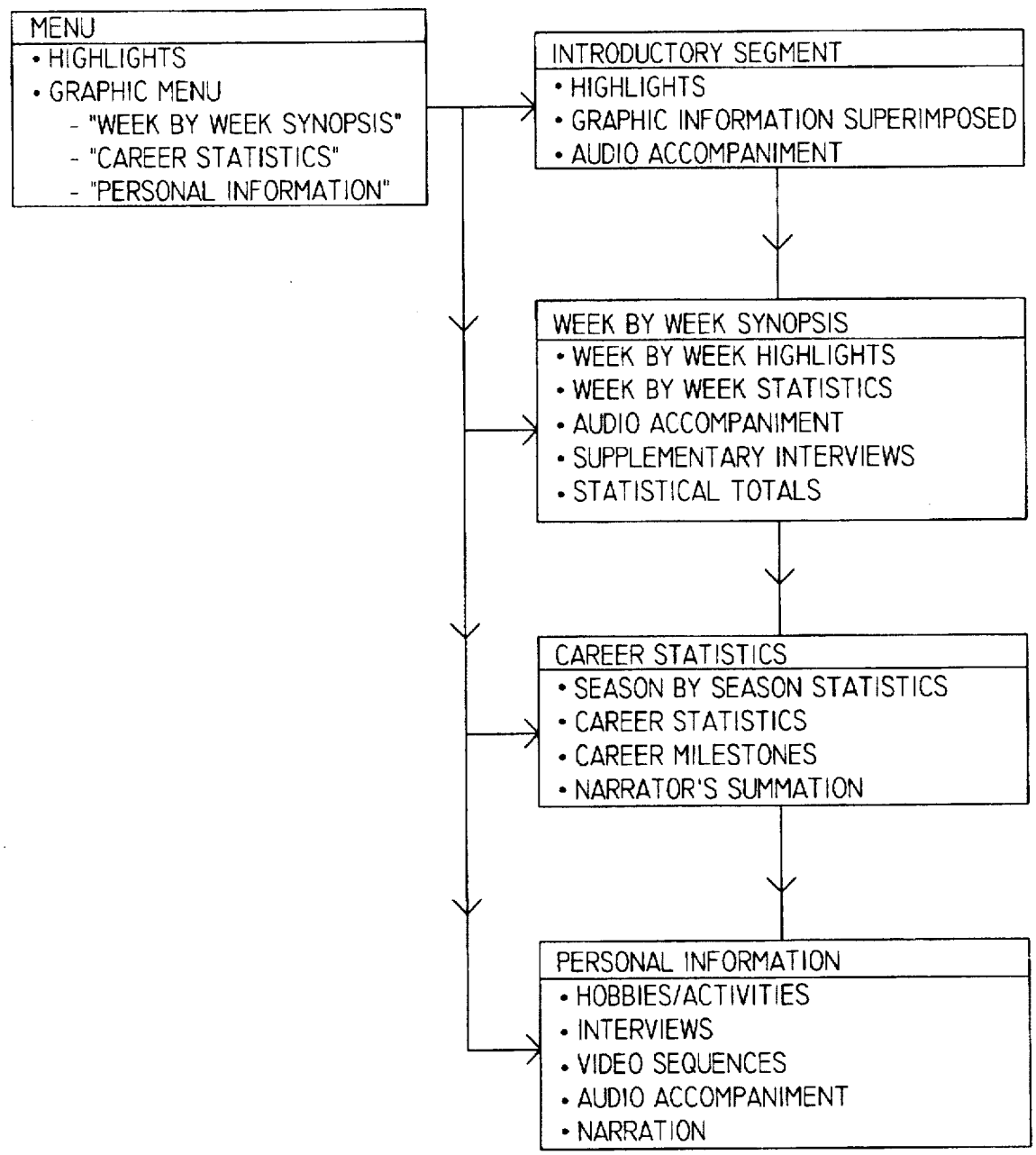

FIG. 5 shows a flowchart of the display sequence of the elements which comprise the video graphics software program of the video highlight sequence in the preferred embodiment of the video sportscard. The video highlight sequence program is stored as data in the video storage means 12. As described in the description of FIG. 2, in the preferred embodiment of the present invention, the video storage means 12 is a circuit board 202 with a read-only memory 200 located in a video game cartridge 136 which is designed to be used with a microcomputer hand-held video game unit 16. The video highlight sequence originates from video recordings of the athlete in action. These video recordings are then formatted into electronic digital data which are programmed into the read-only memory 200 of the circuit board 202 for storage. Once the video highlight sequence has been stored as data in the read-only memory 200 portion of the video storage means 12, it may be accessed and displayed by the hand-held video game unit 16 during the interface condition.

In the preferred embodiment of the video highlight sequence, there is a menu of options displayed at the beginning. The user may select from a number of available starting points at which to begin viewing the video highlight sequence. The menu is as follows:

SELECT STARTING POINT
1 INTRODUCTION
2 WEEK-BY-WEEK SYNOPSIS
3 CAREER STATISTICS
4 PERSONAL INFORMATION

The user can then pick the starting point by using a control means in the form of control buttons 38 located on the body 32 of the hand-held video game unit 16. If the user chooses to view the video highlight sequence from the beginning, he/she will see, in the preferred embodiment, a segment of several action highlights showing the athlete performing. This is a brief introductory segment to introduce the athlete. During these highlights, introductory information in written, graphic form is superimposed on the screen 36. This introductory information includes the athlete's name, the position of the athlete on his/her team, the team's name, the team's logo, the athlete's height and weight and the uniform number of the athlete. The introductory information and highlights are accompanied by an audio portion which includes a musical accompaniment along with the original announcer's broadcast or telecast description of the video highlights and a narrative introduction.

When the introductory segment has been displayed, there begins a week-by-week synopsis of the athlete's accomplishments during the previous season. The week-by-week synopsis is composed of action highlights and the statistics of the athlete superimposed in written, graphic form on the screen. The performance of the athlete during each game of the previous season is chronicled with video highlights and statistics. The week-by-week synopsis is supplemented with an audio accompaniment which comprises music, the original announcer's broadcast or telecast description of the video action of the video highlights and a narration which describes the accomplishments of the athlete. The week-by-week synopsis is interrupted periodically with relevant interviews of the athlete and others associated with his or her performances.

After the conclusion of the week-by-week synopsis, statistical information concerning the athlete in written, graphic form is superimposed over further highlights of the athlete. These statistics include the statistical totals from the previous season, statistical totals over the course of the athlete's career and notes about career milestones and accomplishments of the athlete. The statistics are accompanied by the narrator's concluding comments about the skill and accomplishments of the athlete.

After the statistical segment is finished, there follows a segment of personal information about the athlete. This is an opportunity to describe the athlete's hobbies, community involvement and activities beyond the sport he or she plays. The personal information is relayed in interviews and video sequences. There is also an audio accompaniment composed of audio portions of the interview and a narration describing the athlete's personal information.

The above description provides a preferred embodiment of the video highlight sequence and should not be taken to limit the possible formats for or elements of the video highlight sequence.

Figure 6:
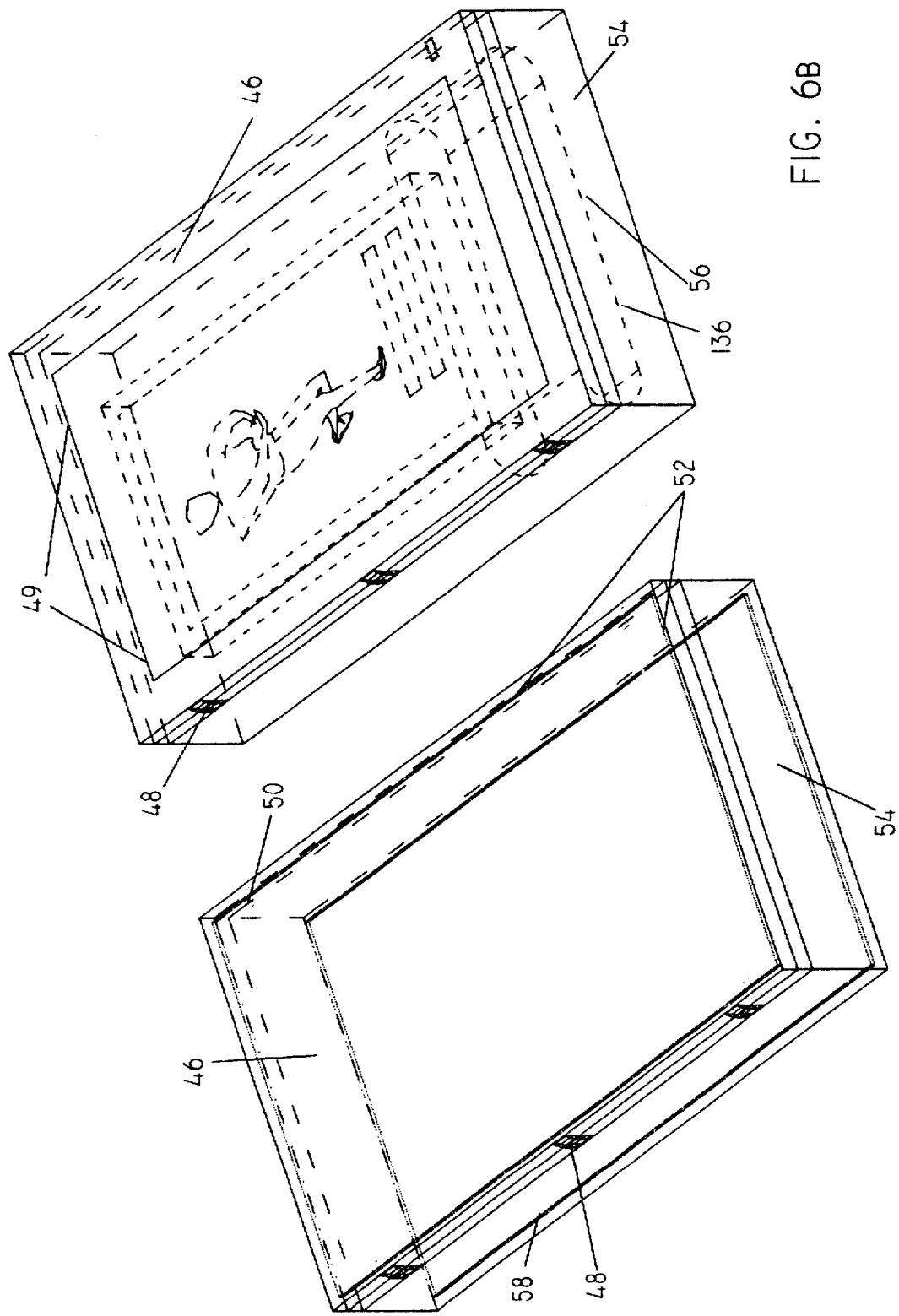

With reference now to FIGS. 6a and 6b, we examine the display box. The display box is an optional accessory.

The preferred embodiment of the display box is shown in FIG. 6a. In the preferred embodiment of the display box, it is made of clear plastic. The outside dimensions of the display box are slightly larger than those of the cartridge 136. A front cover 46 which is attached by a series of plastic hinges 48 to the box body 54 swings open to allow access to the cartridge 136 within. Located along the perimeter of the inside face of the front cover 46 are plastic tabs 50 which hold a front insert booklet 52 in place against the inside face of the front cover 46. The front insert booklet 52 is a booklet that is slightly smaller than the front cover 46. The front insert booklet 52 is approximately ten pages in length. The first, outer page of the front insert booklet 52 has identifying elements 22 such as a color picture of the featured athlete, the athlete's name, team position and team name printed upon it. The pages inside the booklet 52 which succeed the front page have further identifying elements 22 such as color pictures of the athlete, statistical information and personal information concerning the featured athlete printed upon them. The front page of the front insert booklet 52 serves to introduce the athlete and resemble traditional sports trading cards so that even when the cartridge 136 is inside the display box, the exterior of the display box still retains the features of a collectable momento. Integral with the box body 54 of the display box is a molded surround 56 (not shown—see FIG. 6b) which is formed to the exact shape of the video memory cartridge 136. This allows the cartridge 136 to be firmly stored inside the display box. An optional display slot 58 between the back of the molded surround 56 and the inside face of a rear cover (not shown) allows a rear insert (not shown) to be displayed on the back side of the display box in the preferred embodiment of the present invention. The outer face of the rear insert contains identifying elements 22 such as statistics, other written information about the athlete and a reference number. The rear insert resembles the back side of a traditional sports trading card.

FIG. 6b, shows an alternative variation of the display box, again for use when a video game cassette 16 is used as the decorated housing means 10 which contains the video storage means 12. In this alternative version there is no front insert booklet 52. Instead there is a supplemental identification means 49 similar to a front identification means 24. In this alternative version of the display box, instead of a front insert booklet 52, there is a supplemental identification means 49 which is attached to the outer surface of the front cover 46. Like the preferred version of the display box, the front cover 46 has hinges 48 that attach it to the box body 54. There is also a moulded surround 56 which is integral to the structure of the box body 54 so that the cartridge 16 may fit snugly inside the cartridge display box. The cartridge display box may also have an optional display slot 58 (not shown—see FIG. 6a) at the rear portion of the box body 54 to support a rear insert (not shown) such as that described in FIG. 6a which resembles the back side of a traditional, cardboard sportscard and which also resembles the rear identification means 26 described in FIG. 4.

The above descriptions of the display box are the preferred embodiment and a single alternative embodiment. It is anticipated that many other embodiments may be realized in conjunction with the collectable video sportscard. For instance, a clear display box could be utilized which allows the front identification means 24 of a stored cartridge 136 to show through. In addition, the display box could be used with different embodiments of the decorated housing means 10 with a few minor adjustments to the box. Finally, the display box could be used with embodiments of the video sportscard other than a cartridge 136.

FIGS. 2–6 describe the preferred embodiment of the video sportscard. Other means and forms for realizing the video sportscard are anticipated. The above descriptions should not be interpreted as limiting the video collectable to that preferred embodiment.

DESCRIPTION OF THE OPERATION OF THE PREFERRED EMBODIMENT

To use the collectable video sportscard which, in the preferred embodiment, is a modified video game cartridge 136 including a video storage means 12 which contains a video highlight sequence, the user merely removes the cartridge 136 from the optional display box and plugs its interface means 14 into the interface slot 34 of the hand-held video game unit 16. The hand-held video game unit 16 is turned on (power button not shown) and the video highlight sequence contained as data in the form of a video graphics software program inside the video storage means 12 is displayed on the display screen 36 of the hand-held video game unit 16. At the beginning of the video highlight sequence, the user may select, from a menu shown on the display screen 36, which portion of the sequence to start viewing from. The selection is made by using the control buttons 38 of the hand-held video game unit 16. During the viewing of the video highlight sequence, the user can fast-forward, rewind, pause, stop or view the action in slow motion by using the control buttons 38 of the hand-held video game unit 16. The volume of the audio portion of the video highlight sequence can also be adjusted by using the volume control (not shown) of the hand-held video game unit 16. Because the hand-held video game unit 16 may be powered by batteries, the user may bring the unit 16 to any location to allow viewing of the video highlight sequence while trading with other users.

The cartridges 136 are of a size that allows the user to display them in a specially designed album or rack (not shown). Their size also allows them to be stored in a space-efficient manner. Aside from viewing the video highlight sequence contained within the cartridge 136 the user can also look at the cartridges 136 themselves to read the information contained on their surface and to view the pictures also on the exterior surface. The cartridges 136 can also be traded and collected. Entire annually issued sets can also be collected.

If the cartridges 136 are stored in the optional display box described in FIGS. 6a and 6b, the user can also read the information on the outside of the display box as well as look at the pictures. If the display box has an optional front insert booklet 52 the user can read the information and look at the pictures contained within.

DESCRIPTION OF ALTERNATE EMBODIMENTS OF THE PRESENT INVENTION

Figure 7:
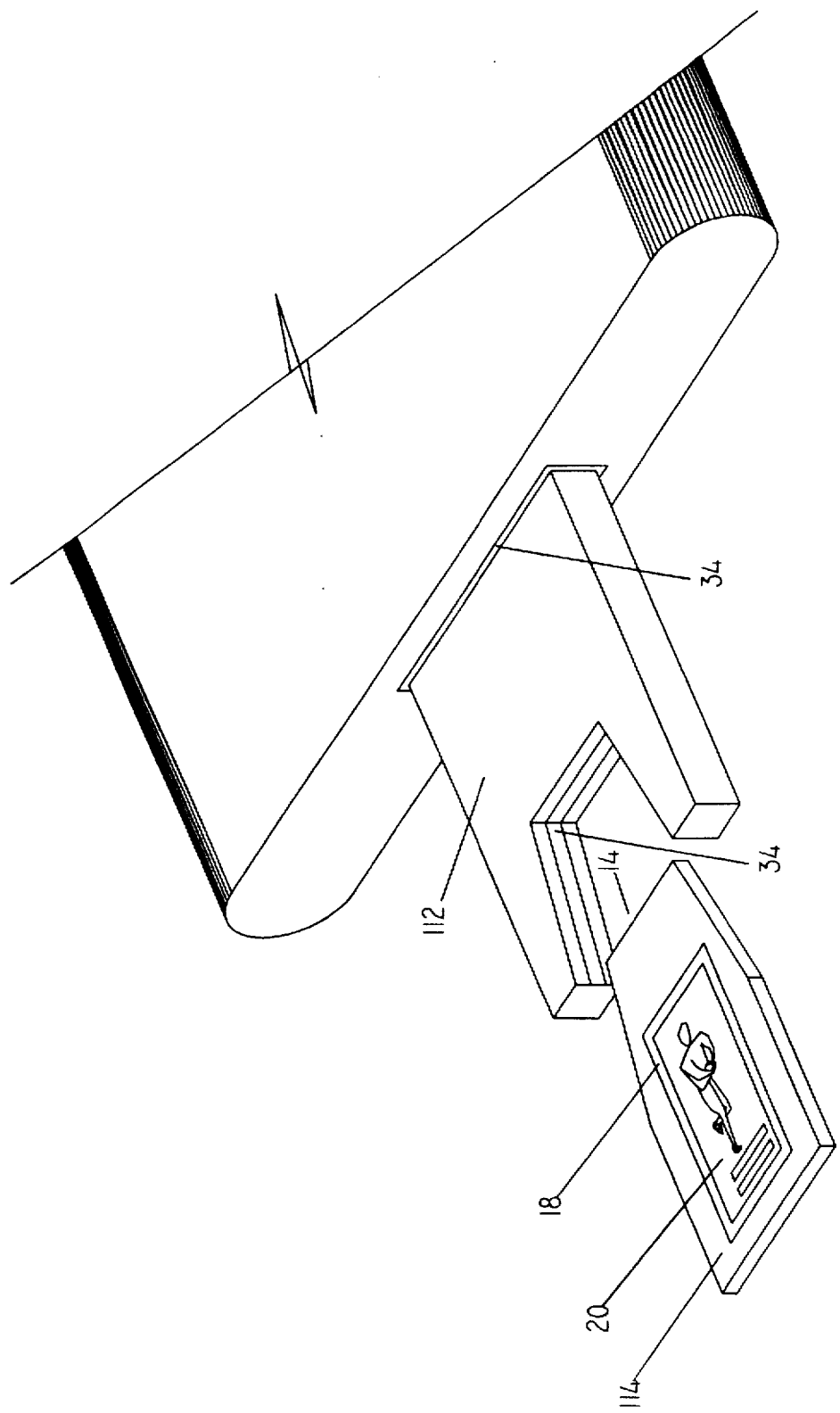

FIG. 7 describes a two-piece cartridge for use with the collectable video sportscard when the video sportscard is realized within the format of a home video game unit 132 (see FIG. 11) or a hand-held video game unit 16. Such a cartridge is described in U.S. Pat. No. 5,395,112 (Codemasters Limited; 1995-03-07), the description of which is incorporated herein by reference. It is an alternative embodiment of a video game cartridge which may be advantageously used as the decorated housing means 10 which houses a video storage means 12 for the collectable video commemorative. The cartridge comprises an interface core 112 and a highlight-specific cartridge attachment 114. The interface core 112 contains electrical circuitry that is not dedicated to the program of the specific video highlight sequence, but which is still necessary for the video game unit in order to display the video highlight sequence. Some of the circuitry which could be included in the interface core 112 includes a bank-switching controller chip, graphics memory, a security circuit, RAM, battery back-up, a graphics co-processor, and additional memory. The highlight specific cartridge attachment 114 contains the electronic circuitry needed to store the data representing a specific video highlight sequence. This circuitry primarily comprises a read-only memory 200 which contains the data representing the video highlight sequence. The interface core 112,and the highlight-specific cartridge attachment 114 have a retrieval means between them which is similar to retrieval means 138. This retrieval means is activated when an interface means 14 of the highlight-specific cartridge attachment 114 is removably connected with an interface slot 34 of the interface core 112. When the retrieval means is thus activated, the two portions of the cartridge together essentially act as a single cartridge because their circuitry is thus interconnected.

To use the two-piece cartridge as applied to the collectable video commemorative, one plugs the interface core 112 into the interface slot 34 of either a hand-held video game unit 16 or a home video game unit 132. The interface core 112 remains in the interface slot 34 while highlight specific cartridge attachments 114 are attached to and removed from the interface core 112. Ideally, each highlight-specific cartridge attachment 114 contains a video highlight sequence featuring a specific athlete and is ideally less than one half of a centimeter thick. Each highlight-specific cartridge attachment 114 supports, with its physical structure, an identification means 20. Ideally, the highlight specific cartridge attachment 114 supports both a front identification means 24 and a rear identification means 26. By utilizing the two-piece video cartridge, collectable video commemoratives could be manufactured much more inexpensively which is of great importance for collectables which are issued in fairly large sets. Large sets are the ideal format for the production of the collectable video commemorative. The two-piece video cartridge could also be contained for storage in the optional display box similar to that described in FIGS. 6a and 6b. The idea behind this two-piece cartridge could be applied to other forms of video storage assemblies for use with the video sportscard. For instance, the decorated housing means for a video tape 92 described in FIGS. 13 and 14 could be implemented in such a format.

Figure 8:
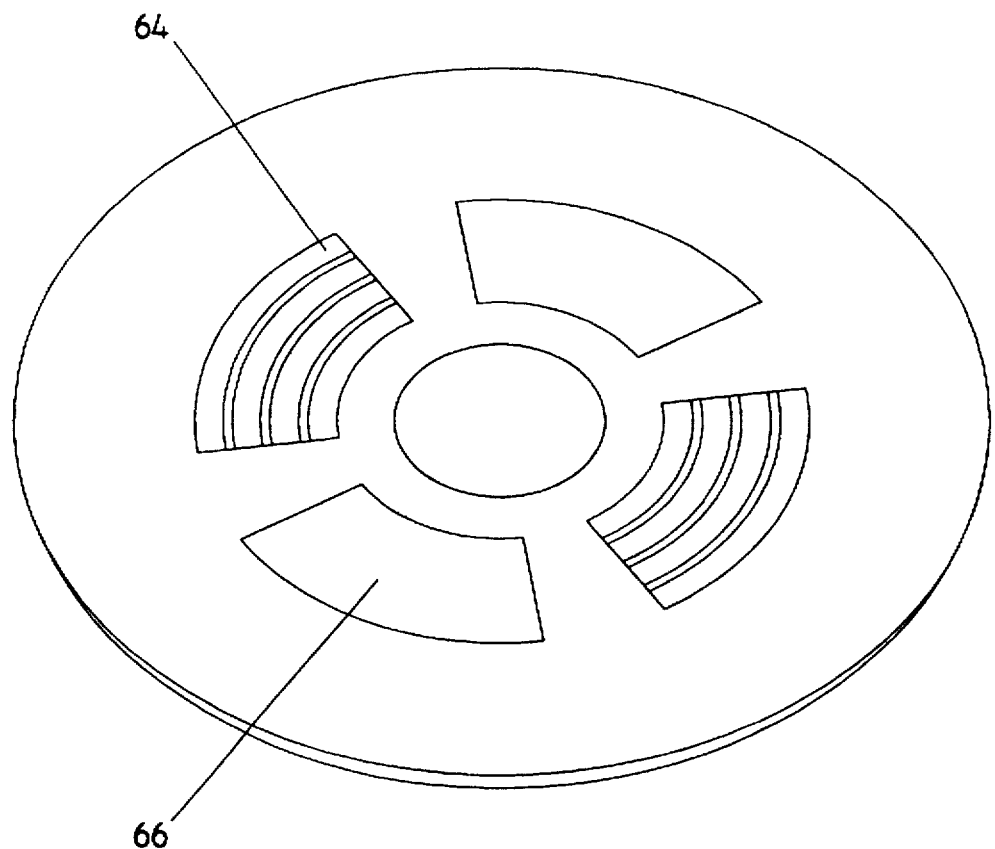

With reference now to FIG. 8, a compact disk and its utilization in the preferred and alternative embodiments of the collectable video sportscard are illustrated. Some hand-held video game systems utilize compact disks as a video storage means 12. In the collectable video sportscard, the video highlight sequence is stored on the disk in the manner in which a video disk stores video information which is well known in the art of video storage. In the preferred embodiment of the utilization of a compact disk as the video storage means 12, the hand-held video game unit 16 used is similar to the hand-held video game unit 16 illustrated in FIG. 2 (A hand-held video game unit which uses a compact disk as its video storage means 12 has not been illustrated in this this specification). The most important difference between it and the hand-held video game unit 16 illustrated in FIG. 2 is that it has a compact disk tray in which the compact disk is placed. This tray also facilitates the reading of the information off the disk so that it can be used in the operation of the hand-held video game unit 16. An example of such a video game system is the Sega CD™ ᴿ video game system by Sega of America™ ᴿ Sega CD™ ᴿ can be attached to both the Game Gear™ ᴿ hand-held video game system and the 16 bit Sega Genesis™ ᴿ home video game system. The system of interconnection between the hand-held video game unit 16 and the video storage means 12, the compact disk, is essentially the same as that outlined in FIG. 2, except that the disk replaces the circuitboard 202 with its attached ROM 200 and the retrieval means 138 embodies a disk reading device (not shown) which reads the data of the video highlight sequence from the disk.

Unlike the preferred embodiment of the video sportscard in which a decorated housing means 10 has an attached identification means 20, when the compact disk is utilized it would ideally have introductory images of the featured athlete imprinted directly on its top surface. In the preferred embodiment of the compact disk, written information 64, including the athlete's name, team position, team name and a reference number are imprinted on the front side of the compact disk. Any identifying elements 22 as described in FIGS. 4a and 4b may be utilized as the written information 64. Pictorial images 66 also are imprinted on the disk. These include photographic or other graphic images of the athlete being featured in the video highlight sequence contained in the compact disk. The combination of these elements produces an introductory image similar to the front identification means 24 described in FIG. 4a.

Figure 11:
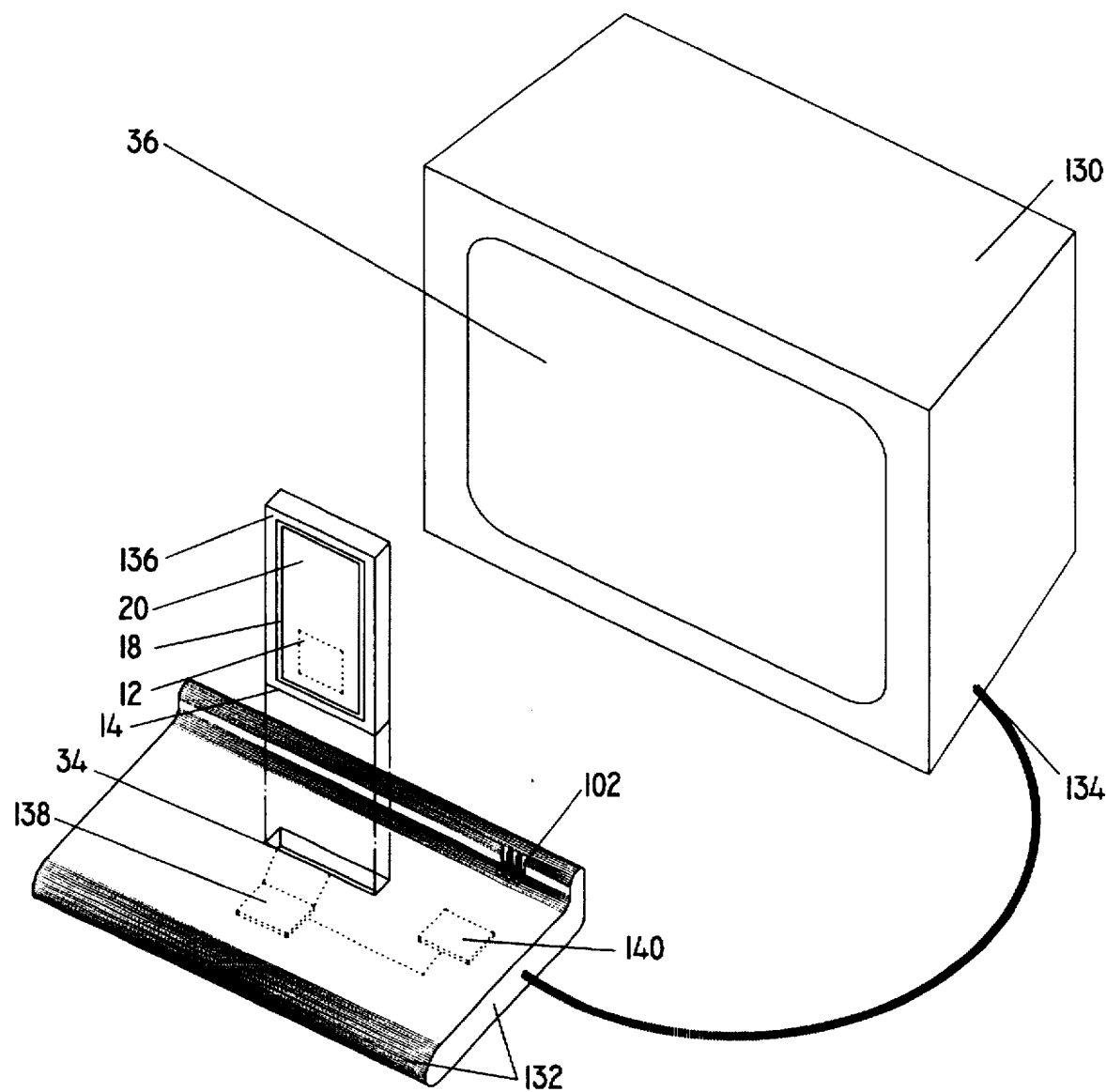

Compact disks can also be used to embody the collectable video commemorative in conjunction with a home video game system. In such an application, the compact disk is decorated as is described above. The home video game unit 132 whose utilization in conjunction with the collectable video sportscard is illustrated in FIG. 11 when utilizing a compact disk as a video storage means 12, remains essentially the same except that it has a compact disk port (not shown) which facilitates interfacing between the compact disk and the home video game unit 132. A home video game unit with a compact disk port is not shown.

Some video playing machines utilize a video disk rather than a video cassette to store video data. A video playing machine and its use in conjunction with the collectable video commemorative will be described in detail in the description of FIG. 12. Such a video disk may be utilized as the decorated housing means 10 and the video storage means 12 of the collectable video commemorative. In such an application, the video disk is decorated as is described above. The video playing machine resembles the video recording or playing machine 98 which will be described in FIG. 12 except that it has a disk port instead of a tape port 100. A video playing machine with a disk port is not shown in the drawings.

A compact disk may also be used as the video storage means 12 for use with a personal computer. The collectable video sportscard may be realized in the format of a personal computer and will be described in FIG. 17. When a CD is utilized it will be decorated as described above. The above description of a compact disk used in various embodiments of the collectable video sportscard should not be interpreted as limiting the decorative possibilities of the CD or the display systems which may utilize the CD to display the video highlight sequence.

Figure 17:
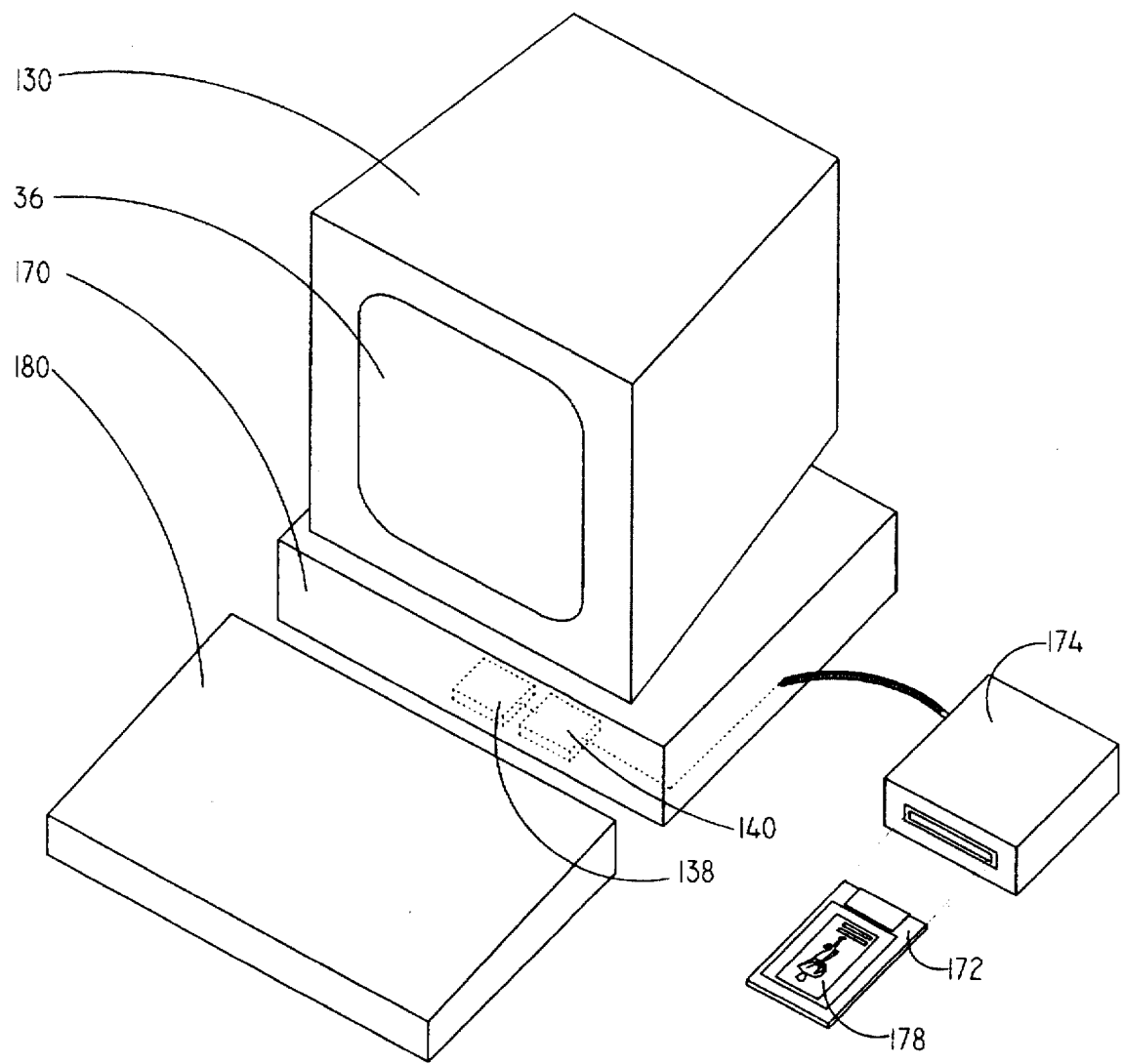

FIGS. 9a and 9b, describe another embodiment of a compact disk which may be utilized as the decorated housing means 10 of the collectable video sportscard when the video sportscard is realized within the format of a hand-held video game system (FIG. 2), a home video game system (FIG. 11), a video recording or playing system (FIG. 12) or a personal computer (FIG. 17). In this embodiment of the compact disk, the disk is housed in a disk cassette similar to the one described in U.S. Pat. No. 4,755,982 (Douwes; 1988-07-05), the description of which is incorporated herein by reference, in which the compact disk is housed in a disk cassette housing 81. FIG. 9a, shows a disk cassette in which an identification means 20 is affixed to the disk cassette front panel 82 to comprise the decorated housing means 10. With this decoration, the disk cassette is imbued with the appearance of a sportscard.

FIG. 9b shows the disk cassette with a slight modification. The difference is that instead of an identification means 20 attached to the disk cassette front panel 82, the disk cassette front panel 82 is clear. This allows the decorated surface of the compact disk 76 to be visible. The decorated surface of the compact disk 76 is described in FIG. 8.

FIGS. 10a and 10b illustrate a compact disk display box. When a compact disk or a video disk is utilized as the video storage means 12, an optional display box is strongly recommended to house the compact disk and to provide the content and format of a sportscard on its exterior surface. FIGS. 10a and 10b illustrate a preferred embodiment and an alternate embodiment, respectively, of the display box for use with a compact disk.

FIG. 10a, describes the ideal embodiment of the compact disk display box. Ideally, the display box for a compact disk would closely resemble the boxes used for the storage of musical compact disks which are well known in the art. For the purpose of holding the compact disk in the present invention, the display box has a disk box front cover 72 connected to the disk box body 74 by hinges 48. The disk box front cover 72 has tabs 50 integral with its structure that support a front insert booklet 52. On the first page of the front insert booklet 52 there are introductory pictorial images and written information that, in combination, provide a cover image that depicts and commemorates the featured athlete in the manner of traditional, cardboard sportscards. The pictorial images and written information are chosen from any number of identifying elements 22 as are described in the description of FIGS. 4a and 4b. In addition, the disk display box also has a means (not shown) for holding the disk securely for protective storage.

FIG. 10b illustrates an alternative embodiment of the disk display box. It is the same as the disk box described in FIG. 10a except that instead of having a front insert booklet 52 supported by tabs 50, there is a front identification means 24 that is attached to the outer surface of the disk box front cover 72 which is connected to the disk box body 74 by hinges 48.

In a third embodiment (not shown) of the compact disk display box, similar in structure to the compact disk cassette described in FIG. 9b the disk display box front cover 72 is made of clear plastic and is undecorated. This allows the decorated surface of the compact disk to show through.

The above descriptions of the disk display box are preferred embodiments only and should not be interpreted as limiting a disk display box used in conjunction with the collectable video commemorative. Many other box arrangements which allow for a decorative, commemorative appearance are possibilities for use with a compact disk as it is applied to the collectable video sportscard.

FIG. 11 describes the collectable video sportscard in the format of a home video game system. Home video game systems are very well known in the art of video games. An example of such a system is the Sega Genesis™ ᴿ system by Sega of America™ ᴿ. The basic elements of such a system are outlined in the patents referenced in the descriptions of FIGS. 2, 3, and 17. The decorated housing means 10 and video storage means 12 are in the form a video game cartridge 136. A compact disk may also be used with a video game system that utilizes compact disks such as the Sega CD™ ᴿ video game system by Sega Inc™ᴿ. A two-piece cartridge, a disk cassette and various other video storage assemblies may also be utilized. The video game cartridge 136 is decorated in the manner disclosed in the descriptions of FIGS. 2 and 4.

The manner in which the video cartridge 136, or other video storage means 12 interacts with the home video game unit 132 to allow the display of the video highlight sequence on the video display monitor 130 is essentially the same as the method for interaction between the video game cartridge 136 and the hand-held video game unit 16 as is described in FIGS. 2,3,19, and 20. The most important difference between the hand-held video game unit 16 and the home video game unit 132 is that the home video game unit 132 utilizes a separate display means in the form of video display monitor 130 such as a television set, other cathode ray tube display screen, liquid crystal display screen, or other video monitor. The home video game unit 132 retrieves the data representing the video highlight sequence from the video storage means 12 through a retrieval means 138 (symbolically shown). The home video game unit 132 outputs the data of the video highlight sequence which is in a format ready to be displayed after having been processed by the processing means 140 (symbolically shown) of the home video game unit 132. The processed data is output as video signals through a connecting means 134, preferably a coaxial cable connected to the antenna terminals of the video display monitor 130 where it is processed by existing circuits and displayed on the display screen 36. A control means 102 (symbolically shown) can be utilized by the viewer to control various aspects of the mode of display (as described in FIGS. 2,5, and 20) of the video highlight sequence.

Figure 12:
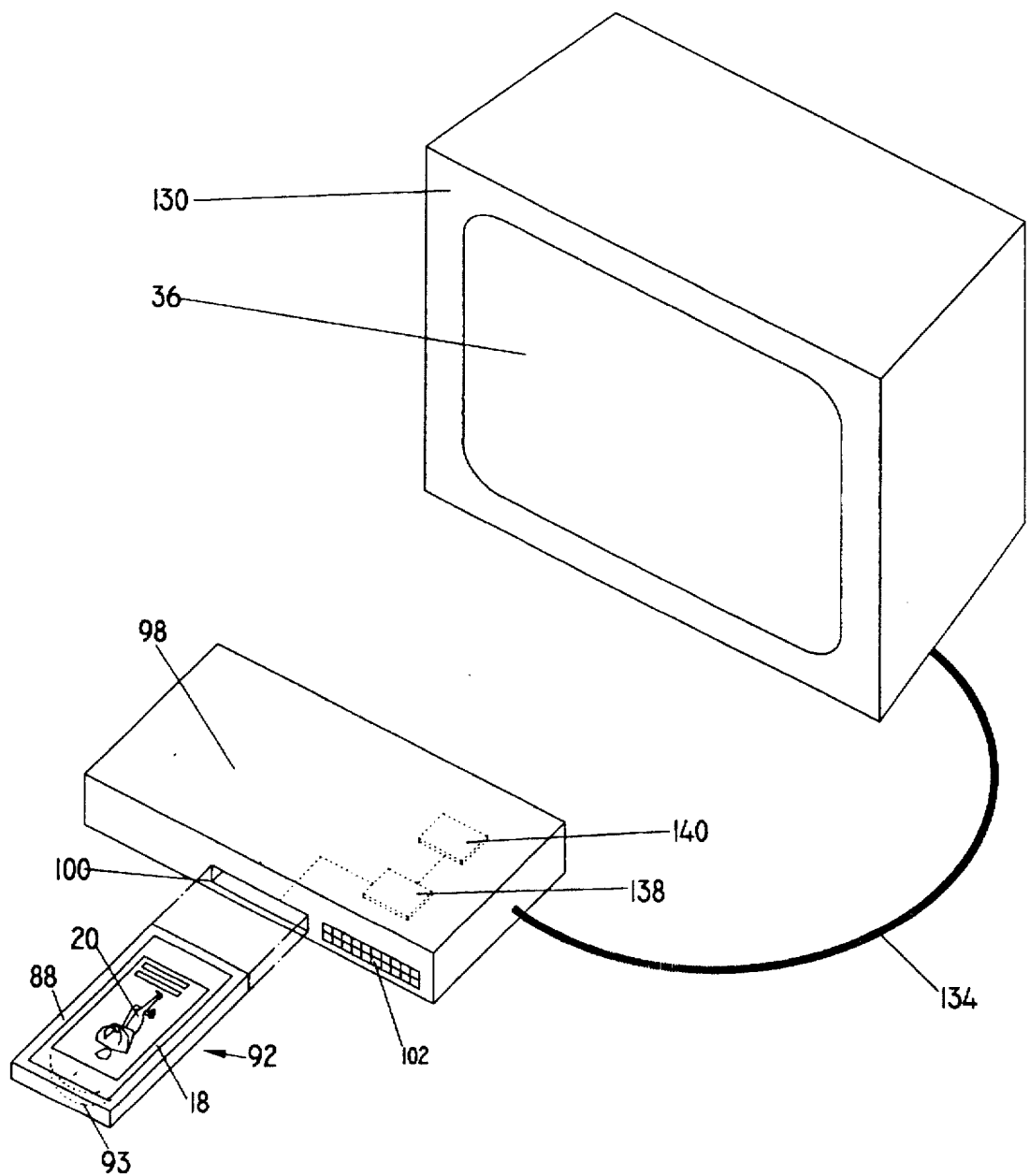

FIG. 12 describes the collectable video sportscard in the format of a video recording or playing system. In this embodiment, the video storage means 12 takes the form of a video cassette tape 93 which is housed in a decorated housing means. In combination, the two elements are a decorated housing means for a video tape 92. When the video sportscard is realized with a video recording or playing system, the decorated housing means for a video tape 92 takes the form of a miniaturized version of a video cassette similar to the cartridge described in U.S. Design Pat. No. 228,789 (Koni; 1972-08-08) (the description of which is incorporated herein by reference) or a standard VHS video cassette. The video tape cartridge will be further described in FIG. 13. The exterior of the cartridge used as a decorated housing means for a video tape 92 supports an identification means 20. A miniature video disk decorated in the manner outlined in FIG. 8 may also be utilized as the decorated housing means 10 and the video storage means 12 in an alternative embodiment. In addition, a standard video tape or any other assembly which may hold video information may be utilized in alternative embodiments in this system. The decorated housing means for a video tape 92 may also be displayed and stored in a display box similar to those described in FIGS. 10a and 10b.

The display means is a combination of a video recording or playing machine 98 (VCR) with a video display monitor 130 having a display screen 36. The video cassette or other decorated housing means for a video tape 92 is inserted in the tape port 100, or disk port (not shown) if a disk is used. A retrieval means 138 (symbolically shown) reads the data representing the video highlight sequence from the video cassette tape 93 or other video storage means 12. A processing means 140 inside the VCR then processes the data into a form which can be utilized by the video display monitor 130 so that it can display the video highlight sequence on the display screen 36. The formatted data in the form of video signals is sent to the independent video display monitor 130 through a connecting means 134. The system of data transfer from the video storage means 12 to the VCR and the methods of operation and interconnection are similar to those outlined in FIGS. 19 and 20.

The viewer may fast-forward, rewind, pause, view the video highlight sequence in slow-motion, and select the point of the video highlight sequence to begin viewing by using the control means 102 located on the exterior of the VCR 98. The above description of a VCR used in conjunction with the collectable video sportscard should not be interpreted to limit the possible embodiments of the video storage means 12 in a form compatable with the VCR.

Figure 13:
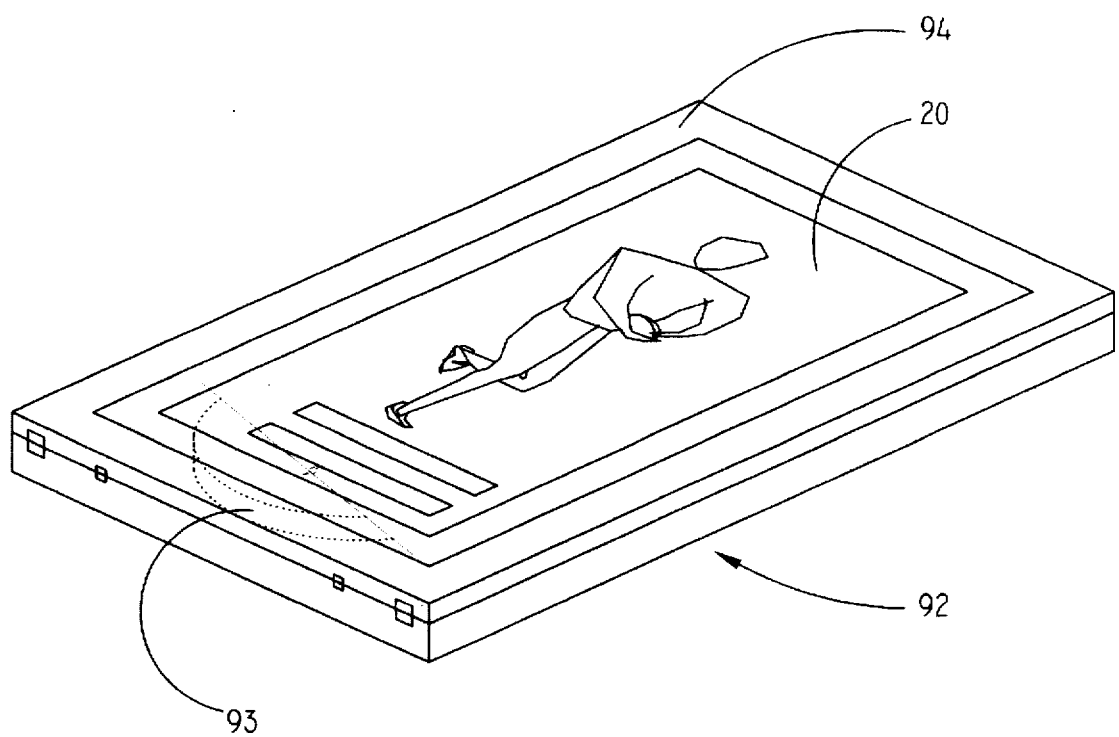

FIG. 13 describes an embodiment for the collectable video sportscard in which the video storage means 12 is a magnetic video tape 93 of the kind used in video recording. The video tape 93, which stores the video highlight sequence is housed in a decorated housing means for a video tape 92 which is different from a standard video cassette. It supports an identification means 20 on its top surface 94 and the shape of the decorated housing means for a video tape 92 is different than that of a standard video tape cassette. It is able to substantially fit inside an open adult hand and thus is smaller than the standard video tape cassette and is more in keeping with the size of traditional collectable sportscards. It also resembles the magnetic tape cartridge for video tape recorder that is described in U.S Design Pat. No. 228,790 (Koni; 1972-08-08), the description of which is incorporated herein by reference. This particular decorated housing means for a video tape 92 is much preferred over a standard video tape cassette which measures approximately ten centimeters by eighteen and one-half centimeters by two and one-half centimeters, because the typical video tape cassette is too big to be efficiently collected in sets and because it does not promote the connotation of commemoratives.

A miniature version of a video tape such as those used with camcorders and a VCR would also work with the video sportscard.

Figure 14:
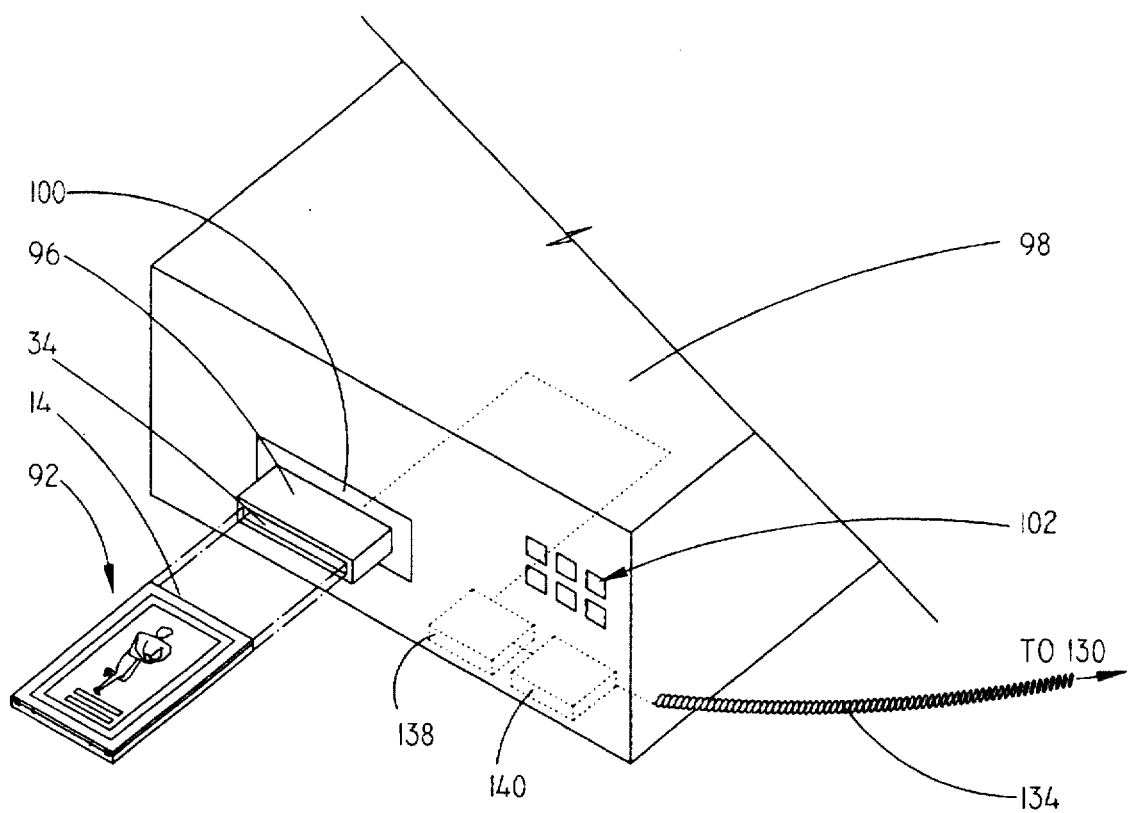

With reference now to FIG. 14 it is noted that because of the different shape of the magnetic tape cartridge and the miniature version of a video tape, an adaptor 96, as shown in FIG. 14, which allows the magnetic tape cartridge as decorated housing means for a video tape 92 to interact with a standard video recording or machine (VCR) 98 to facilitate the display of the video highlight sequence could be implemented. The magnetic tape cartridge as decorated housing means for a video tape 92 has an interface means 14 which has the capacity to interact with the adaptor 96 and the adaptor 96 has the capacity to interact with the (VCR) 98 to allow the VCR 98 to access and read the video highlight sequence so that it can be shown on the video display monitor 130. The decorated housing means for a video tape 92 is inserted into an interface slot 34 of the adaptor 96 which is then inserted into the tape port 100 of the (VCR) 98. In this interface condition the VCR 98 retrieves the data representing the video highlight sequence through a retrieval means 138 (symbolically shown). The VCR 98 then formats the data using its processing means 140 (symbolically shown) into data that can be sent as video signals to a separate video display monitor 130 through a connecting means 134 such as a coaxial cable, so that the video highlight sequence can be displayed on the display screen 36 of the video display monitor 130. The magnetic tape cassette may also be displayed and stored in a display box similar to that described in FIGS. 6a and 6b.

Figure 15:
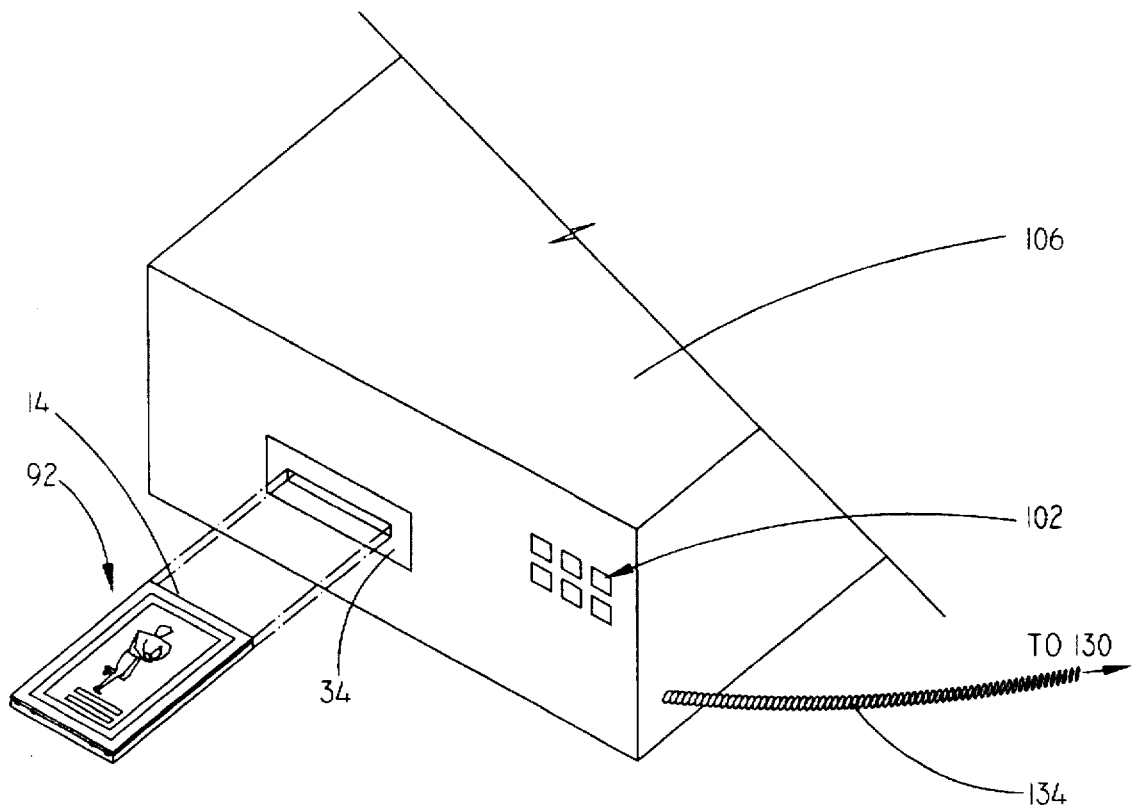

FIG. 15, shows a custom video cassette playing machine (custom VCR) 106 with an interface slot 34 which would allow the magnetic tape cassette as decorated housing means for a video tape 92 to be directly inserted into the custom VCR 106 for the purpose of allowing the video highlight sequence to be shown on a television or other video display monitor 130. The custom VCR 106 would eliminate the need for an adaptor 96. The user can also fast-forward, rewind, pause, view the video highlight sequence in slow-motion, and select the point of the video highlight sequence at which to begin viewing by manipulating the control means 102.

The above descriptions of various embodiments of video tape assemblies for use as the decorated housing means for a video tape 92, should not be interpreted as limiting such possible formats of the collectable video sportscard for use with a VCR. Any assembly which can interact with a VCR or custom VCR may be used if it can retain a resemblance to a baseball card or other collectable sports trading card. In addition, a custom video playing machine of any kind that is specifically designed to display video information stored in sportscard-size decorative housing means 10 would be very appropriate for use with the video sportscard.

Figure 16A:
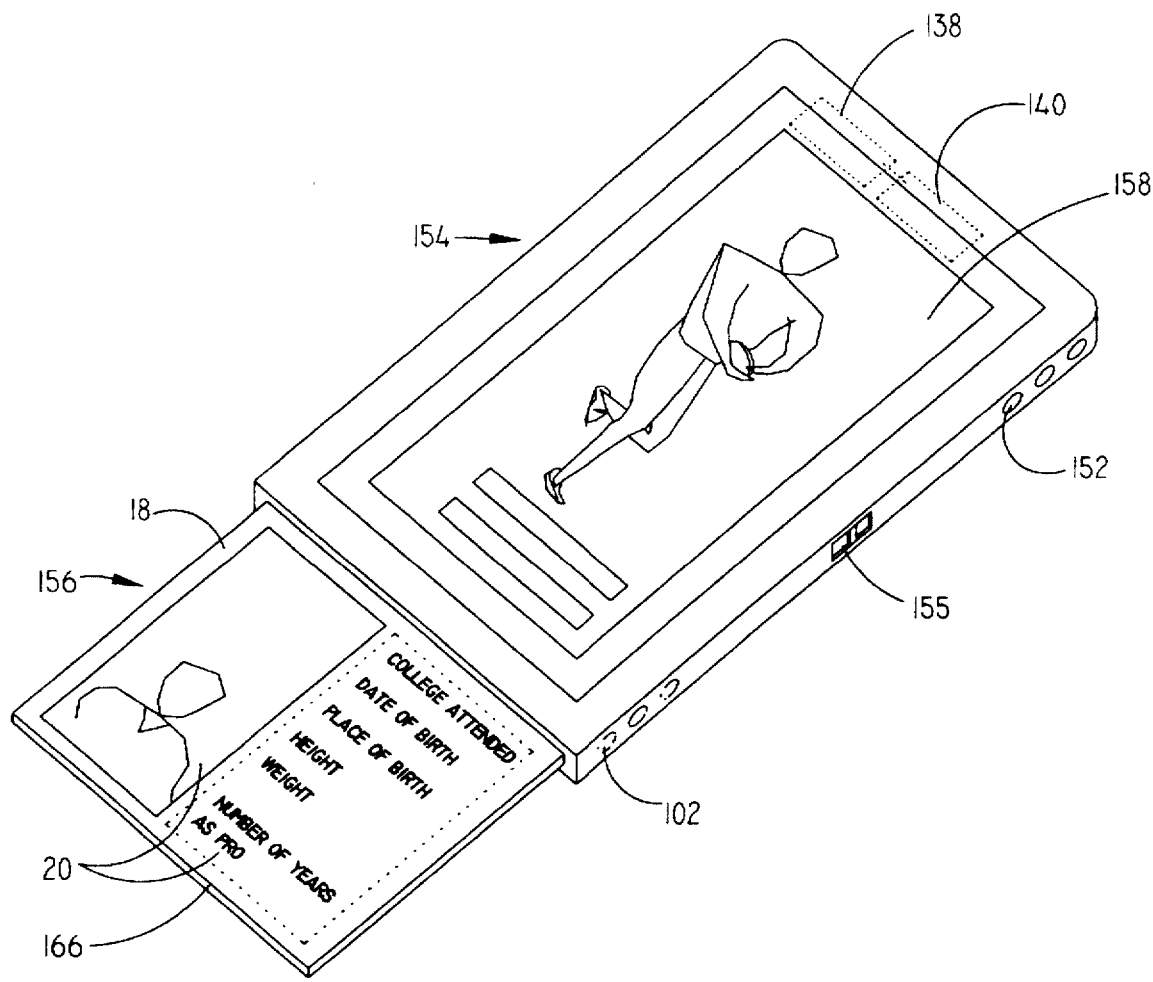
Figure 16B:
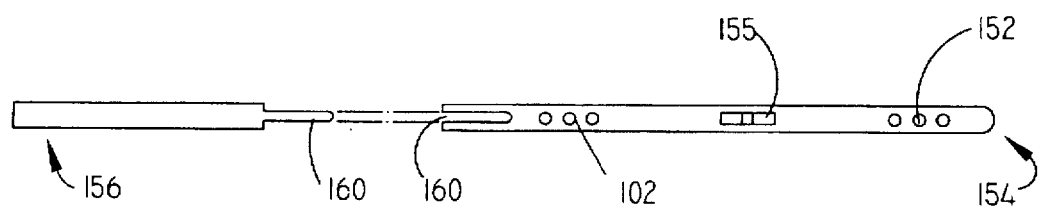

FIGS. 16a and 16b, describe the collectable video sportscard in the format of a liquid crystal photograph as outlined in U.S. Pat. No. 4,754,271 (Edwards; 1988-06-28) the description of which is incorporated herein by reference. The video storage means 12 is embodied in an externally programmed read-only memory (ROM) which holds the video highlight sequence. The ROM is mounted on a second section 156 of a two-piece interconnecting casing and stores data which represents the video highlight sequence. The display means is a liquid crystal display screen 158 which is mounted on the first section 154 of the two-piece interconnecting casing. When the second section 156 and the first section 154 are removably connected through a connection means 160 located on both the first and second sections, and the power is on, the liquid crystal display screen 158 displays the video highlight sequence contained as data in the ROM mounted on the second section 156. Preferably, the connection means 160 is a male/female connection between the two sections, but may be any physical connecting device. Displaying the video highlight sequence on LCD screen 58 is made possible in part because a retrieval means similar to retrieval means 138 (symbolically shown) reads the data representing the video highlight sequence from the ROM. A processing means (symbolically shown) similar to processing means 140 formats the data into a form the liquid crystal display screen 158 can accept to display the video highlight sequence. A power switch 155 is mounted on the first section 156 which allows the user to turn the liquid crystal photograph on and off. Solar cells (not shown) are mounted in the first section 154 which allows the liquid crystal display screen 158 to display a portion of the video highlight sequence even when the power switch 155 is off if the two sections are connected. A mode control means 152 (symbolically shown) is also mounted on the first section 154 which allows the user to select an individual frame of the video highlight sequence, a series of individual frames of the video highlight sequence displayed in a time-delayed sequence, a portion of the video highlight sequence or the entire video highlight sequence to be displayed by the liquid crystal display 158 screen when the power is off. The modes of viewing described above are the preferred embodiments. Other modes of viewing are anticipated.

The decorated housing means 10 consists of several different elements working simultaneously. One of these elements is the liquid crystal display screen 158 which can display an introductory image or images or a series of images which contain a number of identifying elements 22 in a form similar to the identification means 20 described in FIGS. 4a and 4b. The introductory image or images, then, resemble an identification means 20 which serves to decorate the liquid crystal photograph in a manner representative of the qualities of traditional, cardboard, commemorative sportscards even when the power is off as long as the two sections are removably connected and there is sufficient ambient light to power the solar cells. Another element which helps comprise the decorated housing means 10 is a lower portion 166 of the second section 156 of the two-piece interconnecting casing which protrudes from beyond the first section 154 when the two sections are removably connected. This lower portion 166 supports an identification means 20. Thus even when the two sections are not connected, the second section 156 still retains some of the artistic qualities of traditional sportscards through its identification means 20.

The liquid crystal display screen 158 is ideally color. The first section 154 also, ideally, has the capacity to play an audio portion of the video highlight sequence and the ROM ideally has the capacity to store an audio portion of the video highlight sequences The first section 154 also, ideally, has a volume control (not shown) and a control means 102 so that the viewer may fast-forward, rewind, pause, view the video highlight sequence in slow-motion and select a point of the video highlight sequence at which to begin viewing.

The second section 156 of the liquid crystal photograph may be stored in a display box of the type described in FIGS. 6a and 6b. The above description of the liquid crystal photograph is a preferred embodiment of the liquid crystal photograph and should not be interpreted as limiting the elements and arrangements of the liquid crystal photograph in its application as the collectable video sportscard to the description above.

FIG. 17 describes the collectable video sportscard in the format of a personal computing system. In this realization of the collectable video sportscard, the video storage means 12 is in the form of a diskette 172 or a compact disk (not shown). The upper portion of the diskette 172 acts as a means to support decoration 10 and is decorated with a decorated diskette label 178 which supports identifying elements 22 as in an identification means 20. The diskette 172 stores data representing the video highlight sequence. When the diskette 172 is inserted inside a disk drive 174 connected to a personal computer 170, the personal computer 170, through a retrieval means similar to retrieval means 138 (symbolically shown) reads the data representing the video highlight sequence from the diskette 172. A processing means 140 (symbolically shown) processes the data and formats it for display on the display screen 36 of a video display monitor 130. The user may control the mode of the display of the video highlight sequence by using a keyboard 180 to input commands. In this manner, the user can fast-forward, rewind, pause, view the video highlight sequence in slow-motion, and select a point of the video highlight sequence at which to begin displaying. The personal computer 170 ideally has a volume control means input through the keyboard 180.

Ideally, when a diskette 172 is used in the above embodiment, it has a display box similar to the display boxes for a compact disk which are described in FIGS. 10a and 10b except that it is designed to hold a diskette 172 rather than a cartridge.

The video highlight sequence of the collectable video commemorative may also be displayed using a portable, lap-top personal computer which uses a portable CD ROM drive or other portable drive. A system such as the Newton computer pad by Apple may also be utilized.

The above description of the collectable video commemorative in the format of a personal computing system is the preferred embodiment of such a format and should not be interpreted as limiting the possible video storage means 12 or system in general as it may be use in conjunction with the collectable video sportscard. For instance, floppy disks, hard disks and compact disks could all be used as a video storage means 12. When a CD is used, it is decorated as described in FIG. 8 and a CD ROM drive (not shown) is used in place of the disk drive 174.

Figure 18:
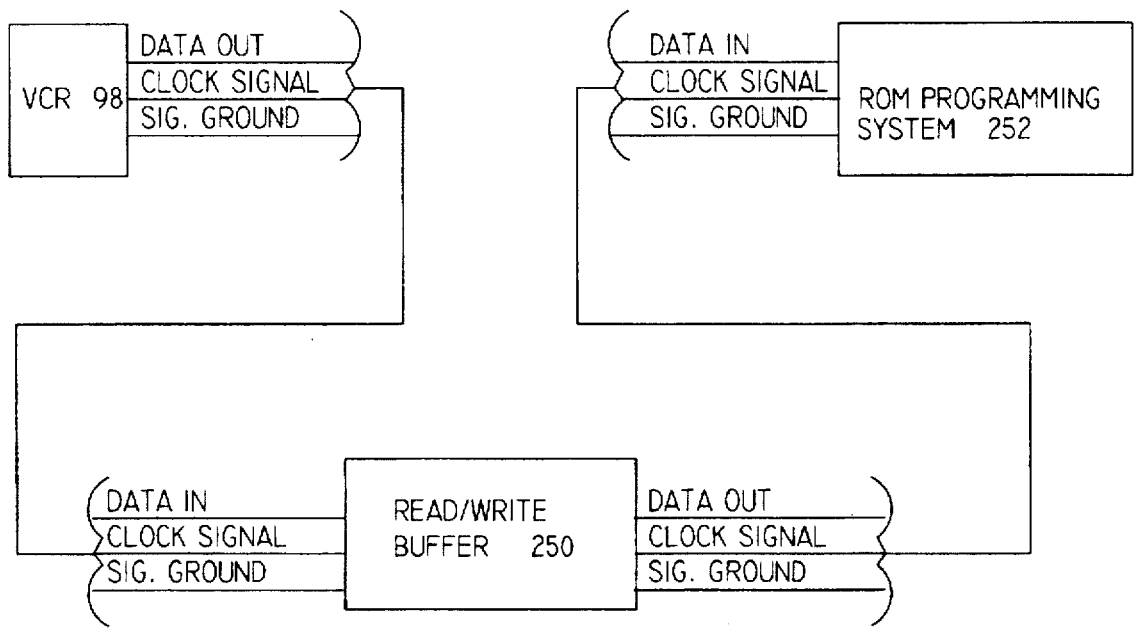

FIG. 18 describes, in more detail, the method of transferring video highlights from a video cassette to data stored in a read-only memory (ROM) 200. This method is described in U.S. Pat. No. 4,754,271 (Edwards; 1988-01-28), the description of which is incorporated herein by reference.

The video highlight sequence is filmed using a camcorder or other movie camera (neither shown). The film is edited to include the audio and graphic portions of the video highlight sequence and is formatted onto a video cassette (not shown). The video cassette is then inserted into a videocassette recorder (VCR) 98. Digital VCRs 98 have the ability to convert analog video signals into digital format. This digital data is stored in a random access memory RAM (not shown) located within the VCR 98 and is used for certain VCR effects including freeze-framing effects.

The video highlight sequence is transferred one frame at a time. A specific frame is selected. The digital clock signal and data signal are then picked off from the VCR 98 and then stored within a properly grounded, independent read-write buffer 250. Buffer 250 is a first-in, first-out memory. From the buffer 250, the data is strobed into a read-only memory (ROM) programming system 252.

After the frame in its digital format is stored in the ROM programming system 252, it is formatted in accordance with the type of display screen 36 it will be displayed on. In the preferred embodiment, the display screen 36 is a liquid crystal display screen (LCD). Thus, the frame is formatted onto ROM 200 in accordance with the LCD row-column matrix upon which it will be displayed. The programmatic commands of the video highlight sequence are also input into the ROM 200 through the ROM programming system 252.

This description of formatting the video highlight sequence so that it may be stored in a ROM is a preferred embodiment and should not be interpreted as limiting the possible method for such data transfer. Alternative methods for such data transfer are well known in the art of video games and video game machines. Such methods are within the scope of the collectable video commemorative.

Figure 19:
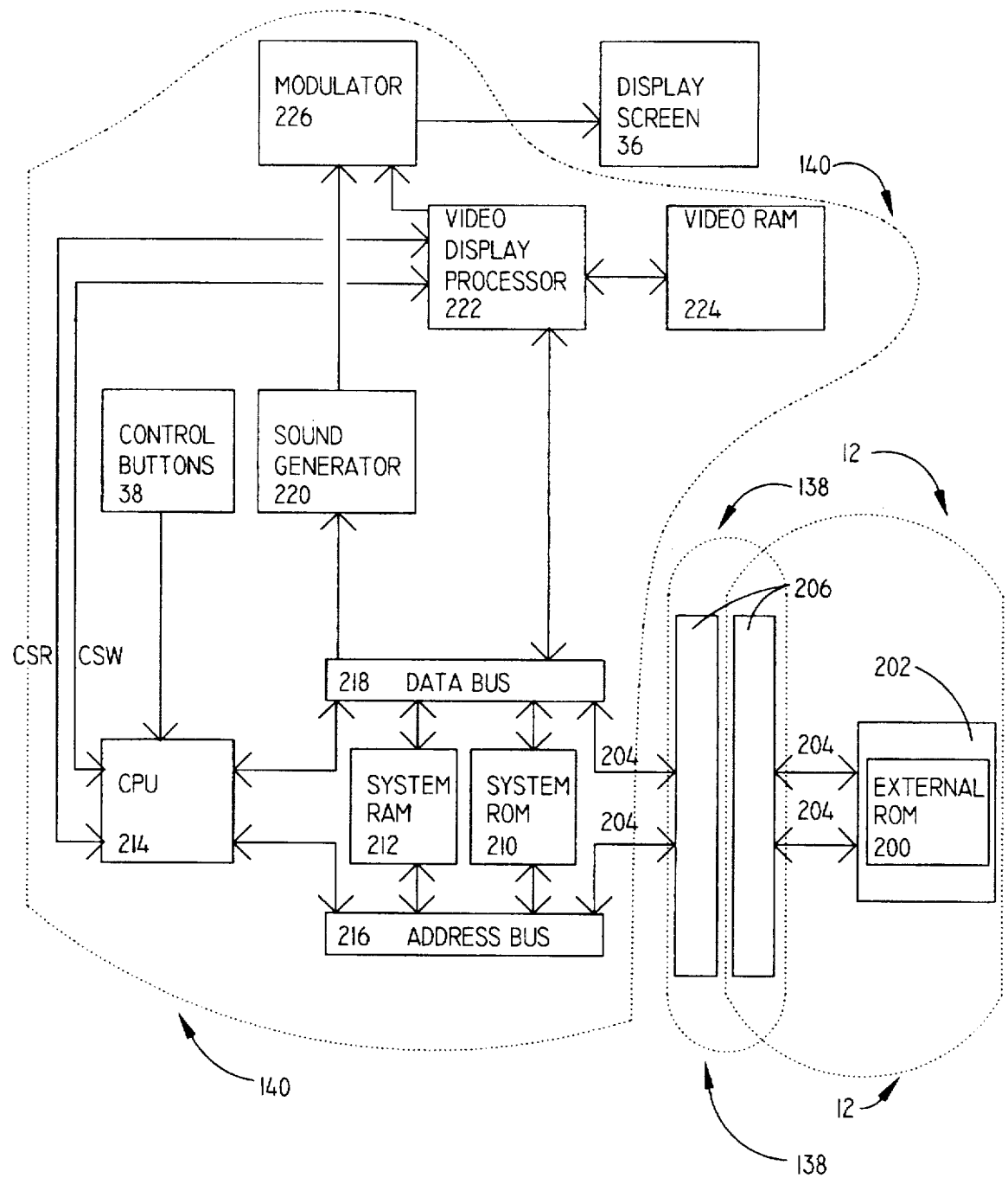

FIG. 19 describes diagrammatically the preferred embodiment of the electrical components of the video storage means 12, the anticipated electrical components of the retrieval means 138, the electrical components of the processing means 140, and the interconnective relationships of all three. The preferred embodiment of this interconnective system is illustrated in the description of the interconnective system in U.S. Pat. No. 4,672,541 (Bromley et al; 1987-06-09) incorporated herein by reference. Further descriptions which relate to the preferred embodiment of this interconnective system are found in U.S. Pat. No. 4,359,222 (Smith III et al; 1982-11-16) and U.S. Pat. No. 4,591,850 the descriptions of both incorporated herein by reference.

In the preferred embodiment of the video storage means 12, the element which stores the program of the video highlight sequence is the read-only memory (ROM) 200 which is attached to a printed circuit board 202. Extending from the ROM circuitry are circuit leads 204 which connect the ROM circuitry to a connector 206. In alternative embodiments, the circuitry of the video storage means 12 may include a bank-switching controller chip, graphics memory, a security circuit, random access memory (RAM), battery back up, a graphics co-processor and additional memory. None of this additional circuitry is shown in the drawings. A further description of this circuitry can be found in U.S. Pat. No. 5,395,112 (Codemasters Limited; 1995-03-07) the description of which is incorporated herein by reference.

In the preferred embodiment, the retrieval means 138 comprises, among other circuitry, connectors 206 mounted on both the memory cartridge 136 and the-hand-held video game unit 16. These connectors 206 come in contact with one another when the interface means 14 of the cartridge 136 is removably connected to the interface slot 34 of the hand-held video game unit 16. The connector 206 of the cartridge is connected through circuit leads 204 to the circuitry, including ROM 200, of the video storage means 12. The connector 206 of the game unit 16 is connected through circuit lead 204 to circuitry, including circuitry of the processing means 140, of the hand-held video game unit 16. When the connectors 206 are connected, the circuitry of the hand-held video game unit 16 is connected with the circuitry of the cartridge 136 for the purpose of communication and data transfer.

In the preferred embodiment, it is anticipated the processing means 140 comprises, among other circuitry, a system ROM 210, a system RAM 212, a central processing unit (CPU) 214, an address bus 216, data bus 218, a sound generator 220, a video display processor 222, a video RAM 224, and a modulator 226. The system ROM 210 contains video processing sub-routines and user-input sub-routines. The system RAM 212 stores temporary information utilized and generated during a specific instance of displaying the video highlight sequence. For instance, system RAM 212 stores the frame numbers of individual frames of the video highlight sequence as they are processed and displayed. User input is achieved through the use of a control means in the form of control buttons 38. Such input is sensed by the CPU 214. CPU 214 addresses the cartridge ROM 200 through address bus 216 and reads data from the programmatic routines stored in the cartridge ROM 200 through data bus 218 in accordance with the commands the user has input. These commands, in the preferred embodiment, in general relate to the order and speed with which the frames of the video highlight sequence are displayed. To display the video highlight sequence, data representing individual frames of the video highlight sequence are read by CPU 214 through data bus 218. CPU 214 then sends such data through data bus 218 to the video display processor 222 which controls that data as it proceeds to video RAM 224. The video display processor 222, periodically allows CPU 214 to read from and write to the video RAM 224 upon occurence of read (CSR) and write (CSW) signals. The video display processor 222 reads the data from video RAM 224 and sends a scan signal to modulator 226. The modulator 226 also receives data signals from the sound generator 220. The modulator 226 then applies a composite video signal to the display screen 36 on which the video highlight sequence can be viewed. In the preferred embodiment, the display screen 36 is a liquid crystal display screen and is driven by driver circuitry internal to what is herein described as video display processor 222 and modulator 226.

The above description of the circuitry of the video storage means 12, the retrieval means 138, the processing means 140, and the interconnection of the three are a preferred embodiment of the circuitry to be used with the collectable video sportscard and should not be interpreted to be the only possible embodiment. This circuitry is well known in the art. There are many circuitry arrangements and electronic elements which may be utilized with both the video storage means and the display means as well as the interconnection between the two to achieve equivalent results for its application with the video sportscard—namely, the display of the video highlight sequence. Such alternative circuitry arrangements are within the scope of the collectable video sportscard.

Figure 20:
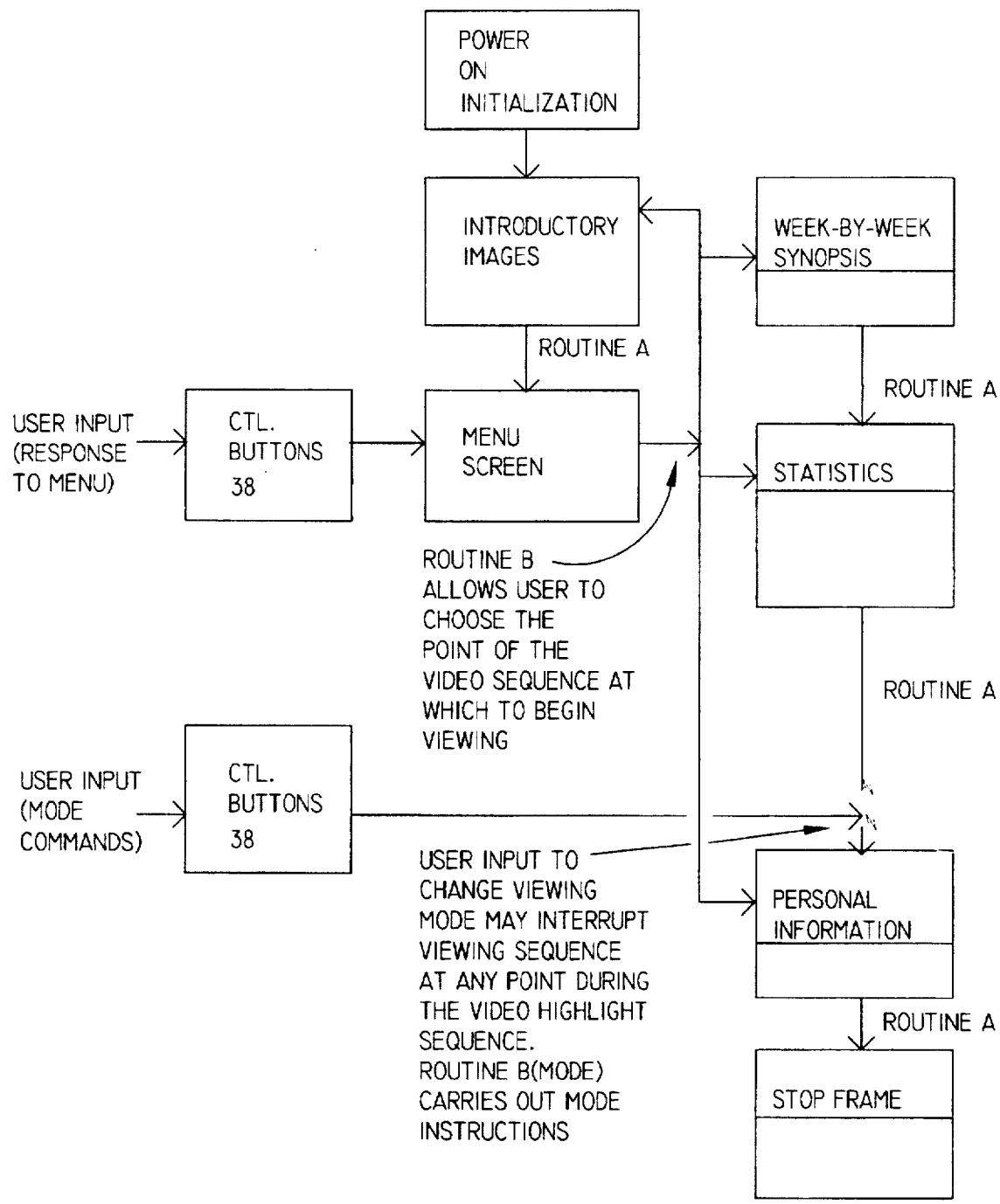

FIG. 20 is a flowchart which describes the actions and interrelationships of the electronic circuitry elements as they carry out the preferred embodiment of the program of the video highlight sequence as it is illustrated in FIG. 5. FIG. 20 and this description relate strongly to the elements described in FIG. 19. This description is a preferred embodiment of the operations of the circuitry and electronic elements.

When the power is turned on (power button not shown) and the cartridge 136 is removably attached to the video game unit 16, system ROM 210, system RAM 212, CPU 214, sound generator 220, video display processor 222, video RAM 224, and modulator 226 are initialized. Routine A is then performed comprising: 1) CPU 214 addresses cartridge ROM 200 through address bus 216 2) CPU 214 reads data representing a first frame of the video highlight sequence from cartridge ROM 200 through data bus 218 3) CPU 214 assigns the numerical marker denoting a specific frame which is contained in the data representing that specific frame to the system RAM 212 4) The CPU 214 writes the data representing the specific frame to the video display processor 222 upon receiving a CSW signal from the video display processor 222 5) The CPU 214 sends data representing the audio portion of the specific frame to the sound generator 220 through data bus 218 6) The video display processor 222 recalls the specific frame from the video RAM 224 and sends a scan signal of data specific to the representation of the specific frame to the modulator 226 7) The sound generator 220 outputs data representing the audio portion of the specific frame to the modulator 226 8) The modulator 226 applies a composite video signal to the display screen 36 9) The display screen 36 displays the visual portion of the frame of the video highlight sequence 10) The speaker 40 produces the sound portion of the frame 11) sub-routines 1–10 are repeated until the program asks for user input, receives user input or reaches the final frame of the video highlight sequence.

Routine A is performed until the introductory segment ends and the menu frame is displayed on the screen 36. The menu frame asks the user to input the location within the video highlight sequence at which to begin displaying. When the user inputs a choice by using the control buttons 38, Routine B is performed. Routine B comprises: 1) CPU 214 senses user input and addresses cartridge ROM 200 through the address bus 216 2) The program located in cartridge ROM 200 directs the CPU 214 to read a particular frame which corresponds with the location within the video highlight sequence chosen by the user Routine A is then performed which results in the video highlight sequence being displayed on the display screen 36.

At any point during the display the user can interupt with a mode command. All user input, with the exception of the menu response, activates a specific variation of Routine B. The variation from Routine B occurs in the commands from the program located in cartridge ROM 200 to the CPU 214. The different commands are activated in response to the user input. For example, if the user presses the button 38 which represents the "reverse" function, Routine B(REV) will be performed. Routine B(REV) is the same as Routine B except that instead of CPU 214 receiving instructions to read a specific frame and begin the frame sequence at that frame, the CPU 214 is directed to perform a sub-program which commands the CPU 214 to read frames in reverse order beginning with the current frame, a marker of which is located in system RAM 212. The CPU 214 reads the numerical marker from system RAM 212 and begins performing Routine B(REV) at that point.

If the user inputs "stop", Routine B(STOP) will be preformed with an instruction to the CPU 214 to display a blank screen or a predetermined stop screen until further user input. Upon user input, the beginning of the video highlight sequence is displayed according to Routine A.

If the user inputs "pause", Routine B(PAUSE) will be performed which directs the CPU 214 to authorize displaying the currently displayed frame until further user input.

If the user inputs "slow-motion", Routine B(SLOW) will be performed which authorizes the CPU 214 to direct the video display processor 222 to slow down the rate of CSW signals, thus causing the video highlight sequence to be displayed at a slower rate.

The video highlight sequence contained as a program in cartridge ROM 200 is thus displayed using Routines A, B, and variations of B until the final frame is displayed, at which time the blank or predetermined stop frame is displayed.

The above description of the operation of the video highlight sequence with regards to the elements of the circuitry is a preferred embodiment. It is anticipated that other routines and circuit arrangements can perform the task of displaying the video highlight sequence. Furthermore, the above description relates to a single format for the contents of the video highlight sequence. Different arrangements and elements of the video highlight sequence will require different operating systems.

Circuitry systems and programming methods which can display a sequence of video images are well known in the art of video games and video game units. Such systems and methods are within the scope of the collectable video sportscard and should be construed to be allowable alternative embodiments of the programming and circuitry structure of the video sportscard.

SUMMARY, RAMIFICATIONS, AND SCOPE

Accordingly, the reader will see that the video sportscard offers great improvements over the traditional sportscard, yet still retains all the essential characteristics of sportscards. In its exterior form, the video sportscard still has pictorial depictions of the athlete, a size approximating the size of a sportscard and the decorative embellishment of a traditional sportscard. However, the addition of video highlights allows the video sportscard to be much more expressive of the abilities of the athlete it features.

Although the description above contains many specificities, these should not be construed as limiting the scope of the video sportscard but as merely providing illustrations of some of the presently preferred embodiments of the video sportscard. For instance, the video sportscard could operate apart from any standard video storage devices and display devices. A specially designed display screen being essentially the size of sportscard could be produced and used in conjunction with a sportscard-sized decorated housing means. Thus, the entire video sportscard, including the display means could connect together and still be essentially the same size as a traditional sportscard and have the additional capabilities of video storage and display.

Thus, the scope of the invention should be determined by the appended claims and their legal equivalents, rather than the examples given.

I claim:

1. A collectable video commemorative device simulating and representing a sportscard, such as a baseball card, in its external appearance, featuring an entity, most commonly a famous athlete and herein referred to as an athlete, on its exterior in a manner and format resembling a sportscard, in addition, the device having the capacity to store a video highlight sequence featuring the same athlete, further, the device having the ability to interface or otherwise interact with a display means, for the purpose of allowing said display means, using its own associated means, to retrieve and display said video highlight sequence, said video commemorative comprising:

a machine-readable video storage means for storing, as data, said video highlight sequence, further, said video storage means may take the form of any number of machine-readable video storage devices having the capability to store video information, including the storage devices selected from the group comprising memory chips, circuit boards, video tape and compact disks;

said video highlight sequence comprised of various moving video images and sequences which feature and commemorate the athlete, said video highlight sequence stored, as data, in said video storage means, said video highlight sequence, further, to be displayed by said display means;

a decorated housing means forming the exterior of said video commemorative and for the purpose of protecting and housing said video storage means, said decorated housing means further having an interface means allowing it to be removably connected to said display means, this interface condition allowing said video highlight sequence to be displayed by said display means through the use of means within said display means, said decorated housing means, further, supporting an identification means;

said identification means comprising pictorial images, statistical information, and graphic embellishment featuring the athlete, said identification means also in a manner and format substantially resembling a sportscard whereby the exterior of said video commemorative is given an attractive, aesthetic, commemorative quality in the spirit of traditional, cardboard sportscards;

said video commemorative also having proportions substantially resembling the proportions of a sportscard, said video commemorative further being of a size such that one video commemorative substantially fits within a typical, open, adult, human hand, whereby said video commemorative is conducive to being displayed, facilitates the exchange of collectable video commemoratives between people, allows space-efficient archival storage of annually issued sets of more than 250 video commemoratives and, in general, is conducive to activities associated with the collection of traditional, cardboard sportscards, whereby, said video commemorative in its appearance and format, in essence, functions as a sportscard, but with the additional feature of supplementing its commemorative value with video highlights.

2. The collectable video commemorative of claim 1, wherein: said collectable video commemorative has an optional display box in which it may be stored, said display box performing the functions of housing said video commemorative and supporting a supplemental identification means comprising pictorial images, statistical information, and graphic embellishment featuring the athlete, said supplemental identification means being in the format and style of a sportscard, whereby said display box is given an attractive, aesthetic quality which serves to commemorate the athlete in the spirit of traditional, cardboard sportscards;

further, said identification means and supplemental identification means, featuring the athlete, comprise any number of identifying elements including those selected from the group comprising pictures of the athlete, holographic images of the athlete, artists' renditions of the athlete, the name of the athlete graphically represented, the autograph of the athlete, personal information about the athlete, information about the career of the athlete, the uniform number of the athlete, the athlete's position on a team, the name of the team on which the athlete plays, the logo of the team on which the athlete plays, relevant statistics, a reference number of the video commemorative in relation to a larger set of video commemoratives of which it is a part, graphic elements which enhance the design of the respective identification means and supplemental identification means and other elements which identify and describe the athlete being featured in said video highlight sequence.

further, said identification means and supplemental identification means being realized in various formats including those formats selected from the group comprising 1) said identifying elements of which said identification means and said supplemental identification means are comprised being displayed on a thin material suitable for attachment to the decorated housing means and said display box, respectively;
2) said identifying elements of which said supplemental identification means is composed comprise being imprinted in a booklet attached to said display box;
3) said identifying elements of which said identification means and said supplemental identification means are comprised being directly imprinted on said decorated housing means and display box, respectively.

3. The collectable video commemorative of claim 2, wherein said video highlight sequence, stored as data in said video storage means, comprises any number of elements including those selected from the group comprising video highlights of a featured athlete performing his or her sport, statistics in graphic form, personal information in graphic form, the name of the athlete, the athlete's position on a team, the athlete's uniform number, the name of the team on which the athlete plays, the logo of the team on which the athlete plays, written and graphic information about the career and past achievements of the athlete, interviews, video sequences which are relevant to the description and commemoration of the athlete, graphic elements such as borders and patterns, and other images which further enhance the design of said video highlight sequence;

said video highlight sequence further having an audio accompaniment comprising any number of elements including those selected from the group comprising announcers' descriptions of the action of the video segments, music, crowd noise, narration which discloses information about the athlete, the audio portion of relevant interviews and other audio elements which contribute to the commemoration of the athlete.

4. The collectable video commemorative of claim 3, wherein the feature of the collectable video commemorative may be any number of entities including the entities selected from the group comprising a plurality of athletes, a specific sporting event, a previous sporting contest, a specific sports team's achievements in previous years, the achievements in a specific sport in previous years, coaches, motion pictures, actors, actresses, musical performers, musical performances, television shows, cartoon characters, historical events, historic personalities and other events, places, people and productions.

5. The collectable video commemorative of claim 4, wherein said video commemorative is realized within a specific system used for displaying video sequences read from machine-readable video storage devices, said specific system having among its associated elements said display means, said display means generally having a retrieval means and a processing means for the purposes of transforming the data of the video highlight sequence into video signals for display, also, generally having a control means for the controllable manipulation of video sequences it displays, further, for the purposes of its use with said video commemorative said control means has among its functions the following:

1) controlling the speed at which said video highlight sequence is played;
2) controlling the chronological sequence of said video highlight sequence as it is being displayed;
3) selecting a specific point of said video highlight sequence at which to begin displaying;
4) facilitating other user-input commands which control the mode of the display on the display screen.

6. The collectable video commemorative of claim 5, wherein the elements which comprise said video commemorative are realized within any number of specific systems used for displaying video sequences read from machine-readable storage devices, said systems including those selected from the group comprising:

1) the system of hand-held video games in which the display means is embodied in a hand-held video game unit with a built-in display screen and in which the decorated housing means and the video storage means, in combination, are chosen from any number of entities including those selected from the group comprising video game cartridges, two-piece video game cartridges, compact disk cassettes, and video storage disks;

2) the format of a home video game system comprising a home video game unit to which said decorated housing means is removably connected, and a separate video display device chosen from a group of display devices including display devices selected from the group comprising television sets and video display monitors, said display device and home video game unit working in combination to comprise said display means, said decorated housing means in combination with said video storage means, to be chosen from a selection of entities including those selected from the group comprising video game cartridges, two-piece video game cartridges, compact disk cassettes, and video storage disks;

3) the system of a video recording or playing machine VCR in connection with a video display device, which together comprise said display means, said decorated housing means and video storage means, in combination, being selected from a group of devices including those devices selected from the group comprising
   a) video cassettes, wherein said video storage means is in the form of a video tape,
   b) miniaturized versions of video cassettes, wherein an associated adaptor is used as needed to allow the mini-video cassette to interface with said video recording or playing machine
   c) compact disk cassettes
   d) magnetic tape cartridges
   e) video storage disks
   further, said video display device being selected from a group of devices including those devices selected from the group comprising
   a) televisions
   b) video display monitors;

4) a personal computing system wherein said video storage means and decorated housing means, in combination are selected from the group comprising
   a) computer diskettes
   b) compact disks
   c) other external machine-read video storage means
   further, a portion of said display means comprises a drive device chosen from a group of drive devices including those devices chosen from the group comprising
   a) disk drives
   b) cd, read-only-memory drives
   said drive device working in combination with a video display device, to comprise said display means, said video display device chosen from a group of devices including those devices selected from the group comprising a) television sets
b) lap-top computers with built-in screens
c) video display monitors.

7. The video commemorative of claim 6, wherein said video commemorative is realized in the format of a liquid crystal photograph, said video commemorative comprising:

said video storage means which is an externally programmable, read-only memory, which further comprises the second section of a two-piece interconnecting casing and which contains data representing said video highlight sequence;

said display means taking the form of a liquid crystal display means situated upon a first section of said two-piece interconnecting casing said liquid crystal display means having a mode control means which has the capacity to display elements of said video highlight sequence in a variety of display modes including the modes selected from the group comprising:
 a) viewing a single frame of said video highlight sequence continuously
 b) viewing a series of selected frames from said video highlight sequence in a time-delayed sequential order
 c) viewing the entire video highlight sequence a connecting means situated upon both pieces of said two-piece interconnecting casing for allowing said video storage means comprising said second section to be inserted into said first section which comprises said display means;

said liquid crystal photograph may have energizing means wherein a plurality of solar cells are connected so as to provide a permanence of power to said display unit to the extent that a viewer may continuously view what is displayed on said liquid crystal display means due essentially to the presence of ambient light when the two sections are removably connected said video commemorative further having two identification means comprising:
 a) with said two-piece casing in its connected position, an identifying element in the form of a predetermined or user selected image displayed on said liquid crystal display screen and which is displayed on the display screen even when the video highlight sequence is not being actively viewed in its entirety due to being powered by said solar cells in the presence of ambient light
 b) an identification means which is integral to a lower portion of said second section of said two-piece interconnecting casing which protrudes beyond the bottom of said first section of said two-piece interconnecting casing when the two sections are in their connected position.

8. The modification of a sportscard, such as a baseball card, into a collectable video commemorative whereby it is given the additional ability to provide video highlight of a featured entity, most commonly an athlete and herein referred to as an athlete, the prototype sportscard of the type comprising pictorial images and graphic embellishment attached to both larger surfaces of an approximately six and one-quarter centimeters by eight and three-quarters centimeters piece of semi-rigid backing material, the modification comprising:

1) providing an inner void in between the two largest exterior surfaces for the purpose of housing a machine-readable video storage means 2) changing the material, as needed, to provide said housing for said video storage means 3) changing the traditional dimensions of the sportscard, as needed, to accomodate the housing of said video storage means, the modified structure surrounding the video storage means and between the two larger, pictorial surfaces is herein referred to as the decorated housing means 4) replications of the pictorial format of the surfaces of the traditional sportscard, in the form of identification means are supported by the decorated housing means, said identification means depicting the featured athlete 5) storing a video highlight sequence depicting the same athlete in motion, as data in said video storage means 6) providing an interface means as part of the structure of the decorated housing means which allows said decorated housing means to removably connect to a display means, the interface condition allowing said display means to access and display said video highlight sequence;

said video storage means may take the form of any number of machine-readable video storage devices including those selected from the group comprising memory chips, circuit boards, video tape, and compact disks;

said video commemorative having proportions substantially resembling the proportions of a sportscard, said video commemorative further being of a size such that one video commemorative substantially fits within a typical, open, adult, human hand, whereby said video commemorative is conducive to being displayed, facilitates the exchange of collectable video commemoratives between people, allows space-efficient archival storage of annually issued sets of more that 250 video commemoratives and, in general, is conducive to activities associated with the collection of traditional, cardboard sportscards;

whereby, said video commemorative, in its appearance and format, in essence, functions as a sportscard, but with the additional feature of supplementing its commemorative value with video highlights.

9. The collectable video commemorative of claim 8, wherein: said collectable video commemorative has an optional display box in which it may be stored, said display box performing the functions of housing said video commemorative and supporting a supplemental identification means comprising pictorial images, statistical information, and graphic embellishment featuring the athlete, said supplemental identification means being in the format and style of a sportscard, whereby said display box is given an attractive, aesthetic quality which serves to commemorate the athlete in the spirit of traditional, cardboard sportscards;

further, said identification means and supplemental identification means, featuring the athlete, comprise any number of identifying elements including those selected from the group comprising pictures of the athlete, holographic images of the athlete, artists' renditions of the athlete, the name of the athlete graphically represented, the autograph of the athlete, personal information about the athlete, information about the career of the athlete, the uniform number of the athlete, the athlete's position on a team, the name of the team on which the athlete plays, the logo of the team on which the athlete plays, relevant statistics, a reference number of the video commemorative in relation to a larger set of video commemoratives of which it is a part, graphic elements which enhance the design of the respective identification means and supplemental identification means and other elements which identify and describe the athlete being featured in said video highlight sequence, further, said identification means and supplemental identification means being realized in various formats including those formats selected from the group comprising 1) said identifying elements of which said identification means and said supplemental identification means are comprised being displayed on a thin material suitable for attachment to the decorated housing means and said display box, respectively;
2) said identifying elements of which said supplemental identification means is composed comprise being imprinted in a booklet attached to said display box;
3) said identifying elements of which said identification means and said supplemental identification means are comprised being directly imprinted on said decorated housing means and display box, respectively.

10. The collectable video commemorative of claim 9, wherein said video highlight sequence, stored as data in said video storage means, comprises any number of elements including those selected from the group comprising video highlights of a featured athlete performing his or her sport, statistics in graphic form, personal information in graphic form, the name of the athlete, the athlete's position on a team, the athlete's uniform number, the name of the team on which the athlete plays, the logo of the team on which the athlete plays, written and graphic information about the career and past achievements of the athlete, interviews, video sequences which are relevant to the description and commemoration of the athlete, graphic elements such as borders and patterns, and other images which further enhance the design of said video highlight sequence;

said video highlight sequence further having an audio accompaniment comprising any number of elements including those selected from the group comprising announcers' descriptions of the action of the video segments, music, crowd noise, narration which discloses information about the athlete, the audio portion of relevant interviews and other audio elements which contribute to the commemoration of the athlete.

11. The collectable video commemorative of claim 10, wherein the feature of the collectable video commemorative may be any number of entities including the entities selected from the group comprising a plurality of athletes, a specific sporting event, a previous sporting contest, a specific sports team's achievements in previous years, the achievements in a specific sport in previous years, coaches, motion pictures, actors, actresses, musical performers, musical performances, television shows, cartoon characters, historical events, historic personalities and other events, places, people and productions.

12. The collectable video commemorative of claim 11, wherein said video commemorative is realized within a specific system used for displaying video sequences read from machine-readable video storage devices, said specific system having among its associated elements said display means, said display means generally having a retrieval means and a processing means for the purposes of transforming the data of the video highlight sequence into video signals for display, also, generally having a control means for the controllable manipulation of video sequences it displays, further, for the purposes of its use with said video commemorative said control means has among its functions the following:

1) controlling the speed at which said video highlight sequence is played;
2) controlling the chronological sequence of said video highlight sequence as it is being displayed;
3) selecting a specific point of said video highlight sequence at which to begin displaying;
4) facilitating other user-input commands which control the mode of the display on the display screen.

13. The collectable video commemorative of claim 12, wherein the elements which comprise said video commemorative are realized within any number of specific systems used for displaying video sequences read from machine-readable storage devices, said systems including those selected from the group comprising:

1) the system of hand-held video games in which the display means is embodied in a hand-held video game unit with a built-in display screen and in which the decorated housing means and the video storage means, in combination, are chosen from any number of entities including those selected from the group comprising video game cartridges, two-piece video game cartridges, compact disk cassettes, and video storage disks;
2) the format of a home video game system comprising a home video game unit to which said decorated housing means is removably connected, and a separate video display device chosen from a group of display devices including display devices selected from the group comprising television sets and video display monitors, said display device and home video game unit working in combination to comprise said display means, said decorated housing means in combination with said video storage means, to be chosen from a selection of entities including those selected from the group comprising video game cartridges, two-piece video game cartridges, compact disk cassettes, and video storage disks;
3) the system of a video recording or playing machine VCR in connection with a video display device, which together comprise said display means, said decorated housing means and video storage means, in combination, being selected from a group of devices including those devices selected from the group comprising
   a) video cassettes, wherein said video storage means is in the form of a video tape,
   b) miniaturized versions of video cassettes, wherein an associated adaptor is used as needed to allow the mini-video cassette to interface with said video recording or playing machine
   c) compact disk cassettes
   d) magnetic tape cartridges
   e) video storage disks further, said video display device being selected from a group of devices including those devices selected from the group comprising
   a) televisions
   b) video display monitors;
4) a personal computing system wherein said video storage means and decorated housing means, in combination are selected from the group comprising
   a) computer diskettes
   b) compact disks
   c) other external machine-read video storage means further, a portion of said display means comprises a drive device chosen from a group of drive devices including those devices chosen from the group comprising a) disk drives b) cd, read-only-memory drives said drive device working in combination with a video display device, to comprise said display means, said video display device chosen from a group of devices including those devices selected from the group comprising a) television sets b) lap-top computers with built-in screens c) video display monitors.

14. The video commemorative of claim 13, wherein said video commemorative is realized in the format of a liquid crystal photograph, said video commemorative comprising:

said video storage means which is an externally programmable, read-only memory, which further comprises the second section of a two-piece interconnecting casing and which contains data representing said video highlight sequence;

said display means taking the form of a liquid crystal display means situated upon a first section of said two-piece interconnecting casing said liquid crystal display means having a mode control means which has the capacity to display elements of said video highlight sequence in a variety of display modes including the modes selected from the group comprising:

a) viewing a single frame of said video highlight sequence continuously b) viewing a series of selected frames from said video highlight sequence in a time-delayed sequential order c) viewing the entire video highlight sequence a connecting means situated upon both pieces of said two-piece interconnecting casing for allowing said video storage means comprising said second section to be inserted into said first section which comprises said display means;

said liquid crystal photograph may have energizing means wherein a plurality of solar cells are connected so as to provide a permanence of power to said display unit to the extent that a viewer may continuously view what is displayed on said liquid crystal display means due essentially to the presence of ambient light when the two sections are removably connected said video commemorative further having two identification means comprising:

a) with said two-piece casing in its connected position, an identifying element in the form of a predetermined or user selected image displayed on said liquid crystal display screen and which is displayed on the display screen even when the video highlight sequence is not being actively viewed in its entirety due to being powered by said solar cells in the presence of ambient light b) an identification means which is integral to a lower portion of said second section of said two-piece interconnecting casing which protrudes beyond the bottom of said first section of said two-piece interconnecting casing when the two sections are in their connected position.

15. The combination of a sportscard, such as a baseball card, featuring an entity, such as an athlete and herein referred to as an athlete, said sportscard, further, of the type comprising an essentially flat piece of semi-rigid material having pictorial images and graphic embellishment attached or otherwise imprinted upon each of the two largest surfaces, combined with a video storage and display system, such as a hand-held video game system, wherein said combination as a collectable video commemorative essentially retains the exterior characteristics of the sportscard but has the additional ability to store a video highlight sequence for display on a display means, said video sportscard comprising a decorated housing means having the outer form and appearance of a sportscard and housing a machine-readable video storage means said video storage means storing a video highlight sequence featuring the same athlete, said video storage means, further, taking the form of any number of machine-readable video storage devices having the capability to store video information, including the storage devices selected from the group comprising memory chips, circuit boards, video tape, and compact disks;

said video highlight sequence comprised of various moving video images and sequences which feature and commemorate the athlete, said video highlight sequence stored, as data, in said video storage means, said video highlight sequence, further, to be displayed by said display means;

said decorated housing means, further, having an interface means as part of its structure, said interface means being able to removably connect with said display means which is a part of said video storage and display system, in the interface condition said display means having access to said video highlight sequence for the purpose of displaying it;

said decorated housing means, further, supporting an identification means which replicates the pictorial images and graphic embellishment of the original sportscard;

said collectable video commemorative also having proportions substantially resembling the proportions of a sportscard, said video commemorative, further, being of a size such that one video commemorative substantially fits within a typical, open, adult, human hand, whereby said video commemorative is conducive to being displayed, facilitates the exchange of video commemoratives amongst people, allows space-efficient archival storage of annually issued sets of more that 250 video commemoratives and, in general, is conducive to activities associated with the collection of traditional, cardboard sportscards;

whereby, said combination acting as a video commemorative, is the cooperative synthesis of the format and content of said sportscard with the capabilities of the video storage and display system to display video images, said combination, in essence, forming a sportscard with a video component.

16. The collectable video commemorative of claim 15, wherein said collectable video commemorative has an optional display box in which it may be stored, said display box performing the functions of housing said video commemorative and supporting a supplemental identification means comprising pictorial images, statistical information, and graphic embellishment featuring the athlete, said supplemental identification means being in the format and style of a sportscard, whereby said display box is given an attractive, aesthetic quality which serves to commemorate the athlete in the spirit of traditional, cardboard sportscards;

further, said identification means and supplemental identification means, featuring the athlete, comprise any number of identifying elements including those selected from the group comprising pictures of the athlete, holographic images of the athlete, artists' renditions of the athlete, the name of the athlete graphically represented, the autograph of the athlete, personal information about the athlete, information about the career of the athlete, the uniform number of the athlete, the athlete's position on a team, the name of the team on which the athlete plays, the logo of the team on which the athlete plays, relevant statistics, a reference number of the video commemorative in relation to a larger set of video commemoratives of which it is a part, graphic elements which enhance the design of the respective identification means and supplemental identification means and other elements which identify and describe the athlete being featured in said video highlight sequence, further, said identification means and supplemental identification means being realized in various formats including those formats selected from the group comprising 1) said identifying elements of which said identification means and said supplemental identification means are comprised being displayed on a thin material suitable for attachment to the decorated housing means and said display box, respectively;
2) said identifying elements of which said supplemental identification means is composed comprise being imprinted in a booklet attached to said display box;
3) said identifying elements of which said identification means and said supplemental identification means are comprised being directly imprinted on said decorated housing means and display box, respectively.

17. The collectable video commemorative of claim 16, wherein said video highlight sequence, stored as data in said video storage means, comprises any number of elements including those selected from the group comprising video highlights of a featured athlete performing his or her sport, statistics in graphic form, personal information in graphic form, the name of the athlete, the athlete's position on a team, the athlete's uniform number, the name of the team on which the athlete plays, the logo of the team on which the athlete plays, written and graphic information about the career and past achievements of the athlete, interviews, video sequences which are relevant to the description and commemoration of the athlete, graphic elements such as borders and patterns, and other images which further enhance the design of said video highlight sequence;

said video highlight sequence further having an audio accompaniment comprising any number of elements including those selected from the group comprising announcers' descriptions of the action of the video segments, music, crowd noise, narration which discloses information about the athlete, the audio portion of relevant interviews and other audio elements which contribute to the commemoration of the athlete.

18. The collectable video commemorative of claim 17, wherein the feature of the collectable video commemorative may be any number of entities including the entities selected from the group comprising a plurality of athletes, a specific sporting event, a previous sporting contest, a specific sports team's achievements in previous years, the achievements in a specific sport in previous years, coaches, motion pictures, actors, actresses, musical performers, musical performances, television shows, cartoon characters, historical events, historic personalities and other events, places, people and productions.

19. The collectable video commemorative of claim 18, wherein said video commemorative is realized within a specific system used for displaying video sequences read from machine-readable video storage devices, said specific system having among its associated elements said display means, said display means generally having a retrieval means and a processing means for the purposes of transforming the data of the video highlight sequence into video signals for display, also, generally having a control means for the controllable manipulation of video sequences it displays, further, for the purposes of its use with said video commemorative said control means has among its functions the following:

1) controlling the speed at which said video highlight sequence is played;
2) controlling the chronological sequence of said video highlight sequence as it is being displayed;
3) selecting a specific point of said video highlight sequence at which to begin displaying;
4) facilitating other user-input commands which control the mode of the display on the display screen.

20. The collectable video commemorative of claim 19, wherein the elements which comprise said video commemorative are realized within any number of specific systems used for displaying video sequences read from machine-readable storage devices, said systems including those selected from the group comprising:

1) the system of hand-held video games in which the display means is embodied in a hand-held video game unit with a built-in display screen and in which the decorated housing means and the video storage means, in combination, are chosen from any number of entities including those selected from the group comprising video game cartridges, two-piece video game cartridges, compact disk cassettes, and video storage disks;
2) the format of a home video game system comprising a home video game unit to which said decorated housing means is removably connected, and a separate video display device chosen from a group of display devices including display devices selected from the group comprising television sets and video display monitors, said display device and home video game unit working in combination to comprise said display means, said decorated housing means in combination with said video storage means, to be chosen from a selection of entities including those selected from the group comprising video game cartridges, two-piece video game cartridges, compact disk cassettes, and video storage disks;
3) the system of a video recording or playing machine VCR in connection with a video display device, which together comprise said display means, said decorated housing means and video storage means, in combination, being selected from a group of devices including those devices selected from the group comprising
   a) video cassettes, wherein said video storage means is in the form of a video tape,
   b) miniaturized versions of video cassettes, wherein an associated adaptor is used as needed to allow the mini-video cassette to interface with said video recording or playing machine
   c) compact disk cassettes
   d) magnetic tape cartridges
   e) video storage disks further, said video display device being selected from a group of devices including those devices selected from the group comprising a) televisions
   b) video display monitors;
4) a personal computing system wherein said video storage means and decorated housing means, in combination are selected from the group comprising
   a) computer diskettes
   b) compact disks
   c) other external machine-read video storage means
   further, a portion of said display means comprises a drive device chosen from a group of drive devices including those devices chosen from the group comprising
   a) disk drives
   b) cd, read-only-memory drives said drive device working in combination with a video display device, to comprise said display means, said video display device chosen from a group of devices including those devices selected from the group comprising
      a) television sets
      b) lap-top computers with built-in screens
      c) video display monitors.

21. The video commemorative of claim 20, wherein said video commemorative is realized in the format of a liquid crystal photograph, said video commemorative comprising:

said video storage means which is an externally programmable, read-only memory, which further comprises the second section of a two-piece interconnecting casing and which contains data representing said video highlight sequence;

said display means taking the form of a liquid crystal display means situated upon a first section of said two-piece interconnecting casing said liquid crystal display means having a mode control means which has the capacity to display elements of said video highlight sequence in a variety of display modes including the modes selected from the group comprising:

a) viewing a single frame of said video highlight sequence continuously
   b) viewing a series of selected frames from said video highlight sequence in a time-delayed sequential order
   c) viewing the entire video highlight sequence a connecting means situated upon both pieces of said two-piece interconnecting casing for allowing said video storage means comprising said second section to be inserted into said first section which comprises said display means;

said liquid crystal photograph may have energizing means wherein a plurality of solar cells are connected so as to provide a permanence of power to said display unit to the extent that a viewer may continuously view what is displayed on said liquid crystal display means due essentially to the presence of ambient light when the two sections are removably connected said video commemorative further having two identification means comprising:
   a) with said two-piece casing in its connected position, an identifying element in the form of a predetermined or user selected image displayed on said liquid crystal display screen and which is displayed on the display screen even when the video highlight sequence is not being actively viewed in its entirety due to being powered by said solar cells in the presence of ambient light
   b) an identification means which is integral to a lower portion of said second section of said two-piece interconnecting casing which protrudes beyond the bottom of said first section of said two-piece interconnecting casing when the two sections are in their connected position.

* * * * *